(12) United States Patent
Urushido et al.

(10) Patent No.: US 12,229,980 B2
(45) Date of Patent: Feb. 18, 2025

(54) INFORMATION PROCESSING APPARATUS AND INFORMATION PROCESSING METHOD

(71) Applicant: SONY GROUP CORPORATION, Tokyo (JP)

(72) Inventors: Kohei Urushido, Tokyo (JP); Takuto Motoyama, Tokyo (JP); Masahiko Toyoshi, Tokyo (JP); Shun Lee, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 377 days.

(21) Appl. No.: 17/753,793

(22) PCT Filed: Jul. 17, 2020

(86) PCT No.: PCT/JP2020/027951
§ 371 (c)(1),
(2) Date: Mar. 15, 2022

(87) PCT Pub. No.: WO2021/059695
PCT Pub. Date: Apr. 1, 2021

(65) Prior Publication Data
US 2022/0351400 A1    Nov. 3, 2022

(30) Foreign Application Priority Data
Sep. 24, 2019  (JP) ................................. 2019-173588

(51) Int. Cl.
*G06T 7/593* (2017.01)
*G01C 3/08* (2006.01)
(Continued)

(52) U.S. Cl.
CPC .............. *G06T 7/593* (2017.01); *G01C 3/085* (2013.01); *G06T 7/73* (2017.01); *H04N 13/239* (2018.05);
(Continued)

(58) Field of Classification Search
CPC ...................................................... G06T 7/593
See application file for complete search history.

(56) References Cited

U.S. PATENT DOCUMENTS

| 11,073,379 B2 * | 7/2021 | Heinrich | ............ H04N 13/239 |
| 2013/0342641 A1 * | 12/2013 | Morioka | ............ H04N 13/204 |
| | | | 348/47 |

(Continued)

FOREIGN PATENT DOCUMENTS

| JP | 2011-099779 A | 5/2011 |
| JP | 2016-009983 A | 1/2016 |

(Continued)

OTHER PUBLICATIONS

International Search Report and Written Opinion of PCT Application No. PCT/JP2020/027951, issued on Sep. 15, 2020, 08 pages of ISRWO.

*Primary Examiner* — Daniel T Tekle
(74) *Attorney, Agent, or Firm* — CHIP LAW GROUP

(57) ABSTRACT

An information processing apparatus includes: a plurality of stereo cameras arranged so that directions of baseline lengths of the stereo cameras intersect each other; a depth estimation unit that estimates, from captured images captured by the plurality of stereo cameras, a depth of an object included in the captured images; and an object detection unit that detects the object based on the depth estimated by the depth estimation unit and reliability of the depth, the reliability being determined in accordance with an angle of a direction of an edge line of the object with respect to the (Continued)

directions of the baseline lengths of the plurality of stereo cameras.

9 Claims, 18 Drawing Sheets

(51) Int. Cl.
*G06T 7/73* (2017.01)
*H04N 13/239* (2018.01)
*H04N 13/00* (2018.01)

(52) U.S. Cl.
CPC .............. *G06T 2207/20076* (2013.01); *H04N 2013/0081* (2013.01)

(56) References Cited

U.S. PATENT DOCUMENTS

| | | | | |
|---|---|---|---|---|
| 2014/0177915 | A1* | 6/2014 | Fan | G06T 7/593 |
| | | | | 382/103 |
| 2017/0090177 | A1* | 3/2017 | Echigo | G06T 3/60 |
| 2017/0264890 | A1* | 9/2017 | Gorilovsky | G03B 37/04 |
| 2018/0032042 | A1* | 2/2018 | Turpin | H04N 13/296 |
| 2018/0278919 | A1* | 9/2018 | Lee | H04N 13/243 |
| 2018/0348781 | A1* | 12/2018 | Zheng | G06V 10/774 |
| 2018/0350086 | A1* | 12/2018 | Sweet, III | G06T 15/08 |
| 2019/0058859 | A1* | 2/2019 | Price | H04N 13/271 |
| 2019/0100140 | A1* | 4/2019 | Takaki | G01S 13/867 |
| 2019/0206075 | A1* | 7/2019 | Ganguli | G06T 7/596 |
| 2019/0213746 | A1* | 7/2019 | Azuma | G01B 11/00 |
| 2019/0340775 | A1* | 11/2019 | Lee | G06T 7/11 |
| 2020/0226392 | A1* | 7/2020 | Hua | G06V 20/647 |
| 2021/0070407 | A1* | 3/2021 | Ishii | B63B 79/10 |
| 2021/0356573 | A1* | 11/2021 | Huang | G01S 15/58 |
| 2021/0366968 | A1* | 11/2021 | Carrion | G02B 13/0065 |
| 2022/0351400 | A1* | 11/2022 | Urushido | G01C 3/10 |
| 2024/0142995 | A1* | 5/2024 | Toyoshi | G08G 1/0968 |

FOREIGN PATENT DOCUMENTS

| | | |
|---|---|---|
| JP | 2018-032986 A | 3/2018 |
| JP | 2018-146457 A | 9/2018 |
| WO | 2013/099169 A1 | 7/2013 |
| WO | 2015/198758 A1 | 12/2015 |

* cited by examiner

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2020/027951 filed on Jul. 17, 2020, which claims priority benefit of Japanese Patent Application No. JP 2019-173588 filed in the Japan Patent Office on Sep. 24, 2019. Each of the above-referenced applications is hereby incorporated herein by reference in its entirety.

FIELD

The present disclosure relates to an information processing apparatus, an information processing method, and an information processing program.

BACKGROUND

A technique has been known, which detects an object from images captured by a stereo camera attached to an unmanned moving body such as a drone.

For example, Patent Literature 1 discloses a ranging system that is provided with a plurality of ranging systems including stereo cameras, and takes, as a final ranging value, a smallest value among a plurality of ranging values obtained by the respective ranging systems. Moreover, Patent Literature 2 discloses a system that is provided with a plurality of stereo cameras, and switches stereo cameras for use in accordance with motions of wipers of a vehicle.

CITATION LIST

Patent Literatures

Patent Literature 1: JP 2018-146457 A
Patent Literature 2: JP 2018-32986 A

SUMMARY

Technical Problem

In the object detection using the stereo camera, for example, on the basis of a parallax of an object seen from right and left cameras, a distance between the camera and the object is measured. However, when the object as a measuring target extends in a direction of a baseline length of the stereo camera, there is a problem that it is difficult to measure the distance.

In this connection, the present disclosure proposes an information processing apparatus, an information processing method and an information processing program, which are capable of detecting an object with high accuracy.

Solution to Problem

According to the present disclosure, an information processing apparatus is provided that includes: a plurality of stereo cameras arranged so that directions of baseline lengths of the stereo cameras intersect each other; a depth estimation unit that estimates, from captured images captured by the plurality of stereo cameras, a depth of an object included in the captured images; and an object detection unit that detects the object based on the depth estimated by the depth estimation unit and reliability of the depth, the reliability being determined in accordance with an angle of a direction of an edge line of the object with respect to the directions of the baseline lengths of the plurality of stereo cameras.

DESCRIPTION OF EMBODIMENTS

Figure 1:
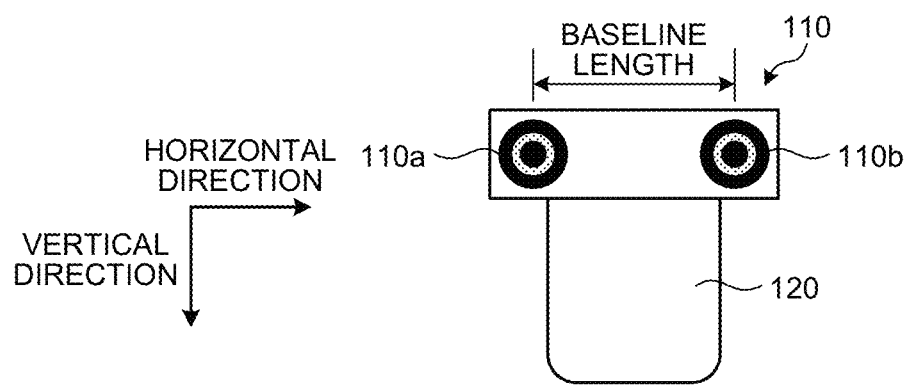
FIG. 1 is a view for explaining a configuration of a general stereo camera system.

A detailed description will be given below of embodiments of the present disclosure with reference to the drawings. Note that, in the following respective embodiments, the same reference numerals are given to the same portions, and a duplicate description will be omitted.

Note that the description will be given in the following order.

<<1. Overview>>
<<2. First embodiment>>
  <2-1. Configuration>
  <2-2. Overview of processing>
  <2-3. Flow of processing>
<<3. Second embodiment>>
<<4. Modified example of second embodiment>>
<<5. Hardware configuration example>>
<<6. Effect>>

1. Overview

First, referring to FIGS. 1 to 5, a description will be given of an overview of information processing to be performed by an information processing apparatus according to embodiments of the present disclosure. FIG. 1 illustrates a configuration of a general stereo camera system 110 to be attached to an unmanned moving body such as a drone for example. This stereo camera system 110 is a binocular camera system provided with two imaging units (cameras) 110$a$ and 110$b$. The stereo camera system 110 is attached to, for example, a lower portion of the unmanned moving body with a support member 120 interposed therebetween.

Figure 2:
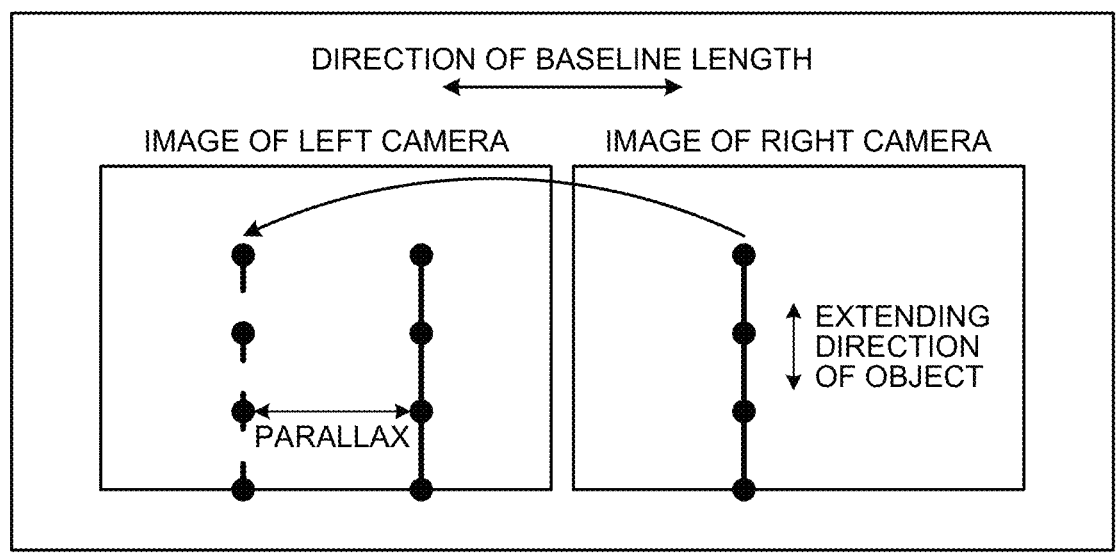
FIG. 2 is a diagram illustrating an example of a case where a direction of a baseline length and an extending direction of an object are different from each other in depth estimation by the stereo camera.

In object detection using such a stereo camera system 110 as described above, by using a method such as triangulation for example, a distance to an object (hereinafter, the distance will be referred to as a "depth") is estimated on the basis of a parallax of the object seen from the left and right imaging units 110$a$ and 110$b$. In this depth estimation, when a direction of a baseline length that indicates a distance between the center of the imaging unit 110$a$ and the center of the imaging unit 110$b$ and an extending direction of the object as a measuring target are not parallel to each other but intersect each other as illustrated in FIG. 2 for example, the depth can be estimated appropriately since it is easy to grasp a correlation between such an object reflected in the video of the right camera and such an object reflected in the video of the left camera.

Figure 3:
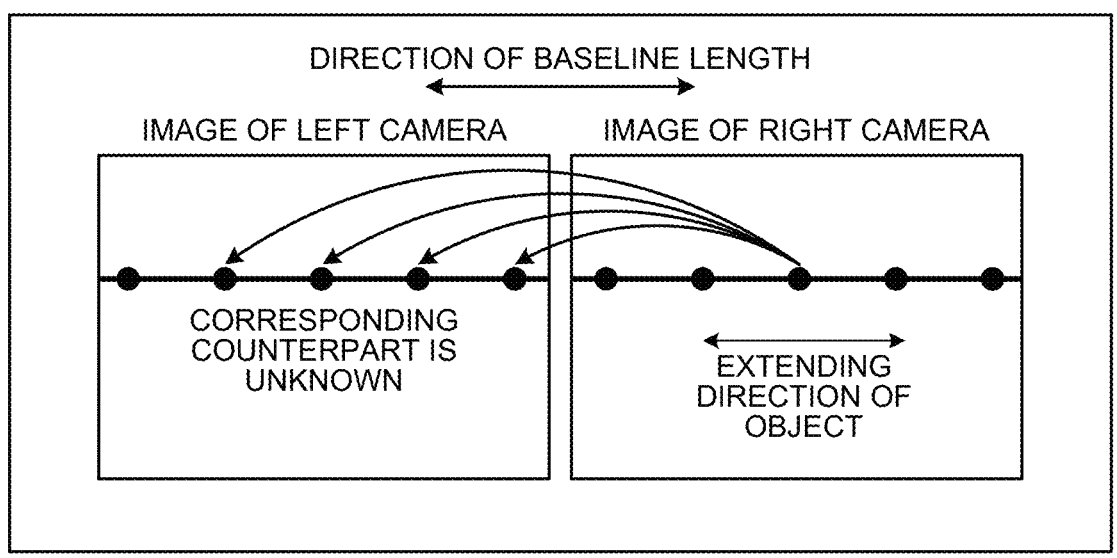
FIG. 3 is a diagram illustrating an example of a case where the direction of the baseline length and the extending direction of the object are the same in the depth estimation by the stereo camera.
Figure 4:
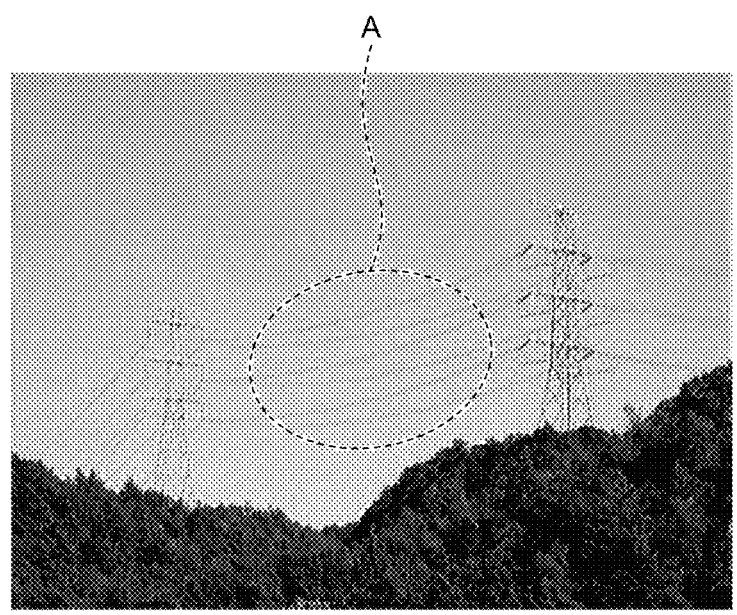
FIG. 4 is a view illustrating an example of a case where a depth cannot be estimated appropriately.
Figure 5:
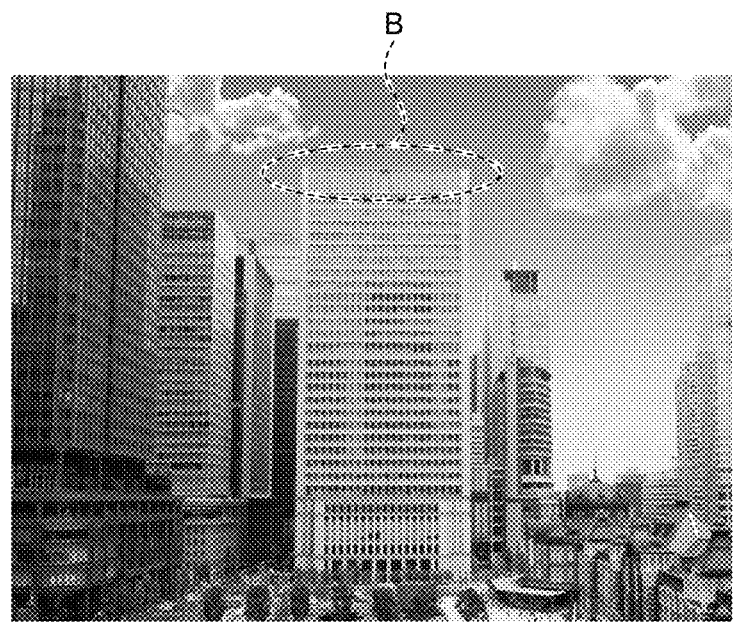
FIG. 5 is a view illustrating an example of the case where the depth cannot be estimated appropriately.

Meanwhile, when the direction of the baseline length and the extending direction of the object as a measuring target are parallel or nearly parallel to each other as illustrated in FIG. 3 for example, the depth cannot be estimated appropriately since it is difficult to grasp the correlation between the object reflected in the video of the right camera and the video reflected in the video of the left camera. Therefore, for example, in the case of operating the stereo camera system 110 while attaching the same to the unmanned moving body so that the direction of the baseline length and the horizontal direction coincide with each other (see FIG. 1), there occurs a malfunction that electric wires as illustrated in a portion A of FIG. 4 cannot be recognized, or that a top portion of a building, which is as illustrated in a portion B of FIG. 5, is recognized to protrude forward.

Accordingly, the information processing apparatus according to the present disclosure uses a trinocular camera system with three lenses arranged in a V shape for example, estimates the depth by two stereo cameras, thereafter performs edge processing for captured images, and detects an edge of an object. Then, the information processing apparatus according to the present disclosure calculates a map voting probability of an occupancy grid map on the basis of reliability of the depth, which corresponds to a direction of the edge (hereinafter, the direction will be referred to as an "edge direction") of the object included in the captured images, reflects the calculated map voting probability on the occupancy grid map, and thereby detects the object.

2. First Embodiment

<2-1. Configuration>

Figure 6:
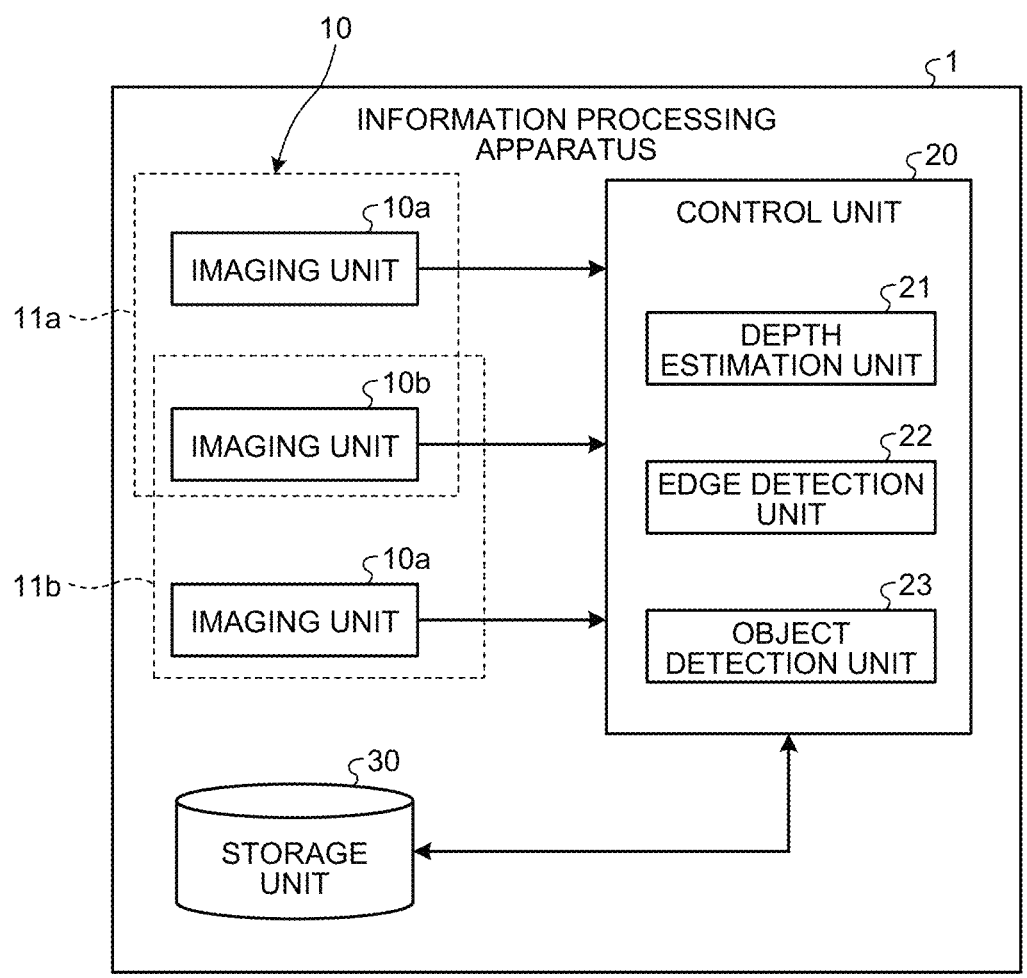
FIG. 6 is a block diagram illustrating a configuration of an information processing apparatus according to a first embodiment of the present disclosure.

Next, referring to FIGS. 6 to 8, a description will be given of a configuration of an information processing apparatus 1 according to the first embodiment. The information processing apparatus 1 is an apparatus that is mounted on an unmanned moving body such as a drone for example and detects an object from images captured by a trinocular camera system. Note that, in the present embodiment, a description will be given of an example where the information processing apparatus 1 is mounted on the unmanned moving body. However, besides this, the information processing apparatus 1 may be mounted on an autonomous mobile robot, a vehicle, a portable terminal, or the like, which is for use in a factory, home, or the like. As illustrated in FIG. 6, the information processing apparatus 1 includes three imaging units (cameras) 10*a*, 10*b*, and 10*c*, a control unit 20, and a storage unit 30.

Each of the imaging units 10*a*, 10*b*, and 10*c* has an optical system composed of a lens, a diaphragm, and the like, and has an image sensor, and performs processing for capturing a subject. Each of the imaging units 10*a*, 10*b*, and 10*c* outputs, to the control unit 20, an image captured thereby (hereinafter, the image will be referred to as a "captured image"). Moreover, the imaging units 10*a*, 10*b*, and 10*c* constitute a stereo camera system 10 including a first stereo camera 11*a* and a second stereo camera 11*b*.

Figure 7:
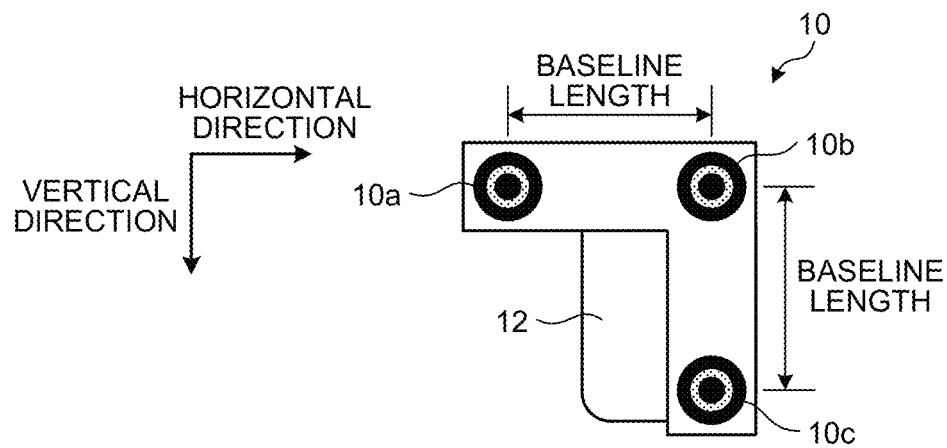
FIG. 7 is a diagram illustrating an example of a configuration of a stereo camera system provided in the information processing apparatus according to the first embodiment of the present disclosure.
Figure 8:
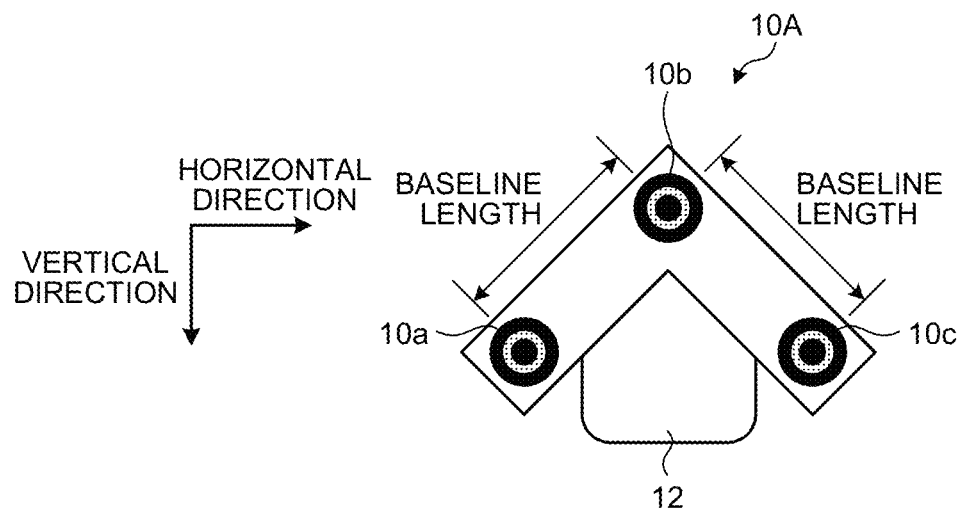
FIG. 8 is a diagram illustrating an example of a configuration of a stereo camera system provided in the information processing apparatus according to the first embodiment of the present disclosure.

As illustrated in FIG. 7 for example, the stereo camera system 10 is a trinocular camera system including three imaging units 10*a*, 10*b*, and 10*c*. The stereo camera system 10 is attached to, for example, a lower portion of the unmanned moving body with a support member 12 interposed therebetween. The imaging units 10*a*, 10*b*, and 10*c* are arranged in a V shape. That is, the first and second stereo cameras 11*a* and 11*b* are arranged so that a direction of a baseline length of the first stereo camera 11*a* and a direction of a baseline length of the second stereo camera 11*b* are perpendicular to each other.

The imaging unit 10*a* and the imaging unit 10*b* which constitute the first stereo camera 11*a* are arranged side by side in the horizontal direction. That is, the direction of the baseline length that connects the imaging unit 10*a* and the imaging unit 10*b* to each other coincides with the horizontal direction. Moreover, the imaging unit 10*b* and the imaging unit 10*c* which constitute the second stereo camera 11*b* are arranged side by side in the vertical direction. That is, the direction of the baseline length that connects the imaging unit 10*b* and the imaging unit 10*c* to each other coincides with the vertical direction. Note that the first and second stereo cameras 11*a* and 11*b* just need to be arranged so that the directions of the respective baseline lengths intersect each other, and the directions of the respective baseline lengths may make other angles than a right angle.

Herein, the directions of the baseline lengths of the first and second stereo cameras 11*a* and 11*b* do not have to coincide with the horizontal direction or the vertical direction. For example, in the information processing apparatus 1, a stereo camera system 10A illustrated in FIG. 8 may be used in place of the stereo camera system 10 illustrated in FIG. 7. In the stereo camera system 10A, the imaging unit 10*a* and the imaging unit 10*b* which constitute the first stereo camera 11*a* are arranged to be deviated from the horizontal direction or the vertical direction. Moreover, in the same way, the imaging unit 10*b* and the imaging unit 10*c* which constitute the second stereo camera 11*b* are arranged to be deviated from the horizontal direction or the vertical direction.

The control unit 20 can be achieved by a variety of processors, for example, such as a central processing unit (CPU), a graphics processing unit (GPU), and a field programmable gate array (FPGA). The control unit 20 executes a variety of processing for the captured images input from the imaging units 10*a*, 10*b*, and 10*c*. The control unit 20 includes a depth estimation unit 21, an edge detection unit 22, and an object detection unit 23.

From the captured images captured by the first and second stereo cameras 11*a* and 11*b*, the depth estimation unit 21 estimates a depth of the object included in the captured images. On the basis of a parallax of the object seen from the imaging units 10*a* and 10*b* and a parallax of the object seen from the imaging units 10*b* and 10*c*, the depth estimation unit 21 estimates the depth by using, for example, a known method such as triangulation.

From the captured images captured by the first and second stereo cameras 11*a* and 11*b*, the edge detection unit 22 detects an edge of the object included in the captured images. Note that the "edge" refers to a continuous line that indicates a boundary of the object. The edge detection unit 22 detects the edge of the object from a monocular image (RGB image) captured by any of the imaging units 10*a*, 10*b*, and 10*c*, and generates an edge image (see FIG. 10 to be described later).

The object detection unit 23 detects the object on the basis of depth information generated by the depth estimation unit 21 and edge information generated by the edge detection unit 22. The object detection unit 23 detects the object on the basis of the depth estimated by the depth estimation unit 21 and reliability of a depth, which is to be determined in accordance with an angle of the object in the edge direction with respect to the directions of the baseline lengths of the first and second stereo cameras 11*a* and 11*b*. Note that details of the processing in the object detection unit 23 will be described later.

The storage unit 30 holds a variety of information. The storage unit 30 stores programs, for example, for achieving the respective units of the control unit 20. In this case, the control unit 20 unfolds and executes the programs stored in the storage unit 30, and thereby achieves functions of the respective units. The storage unit 30 can be achieved, for example, by a semiconductor memory element such as a random access memory (RAM), a read only memory (ROM) and a flash memory, or by a storage device such as a hard disk, a solid state drive, and an optical disc. Moreover, the storage unit 30 may be composed of a plurality of memories different from one another, or the like.

<2-2. Overview of Processing>

Figure 9:
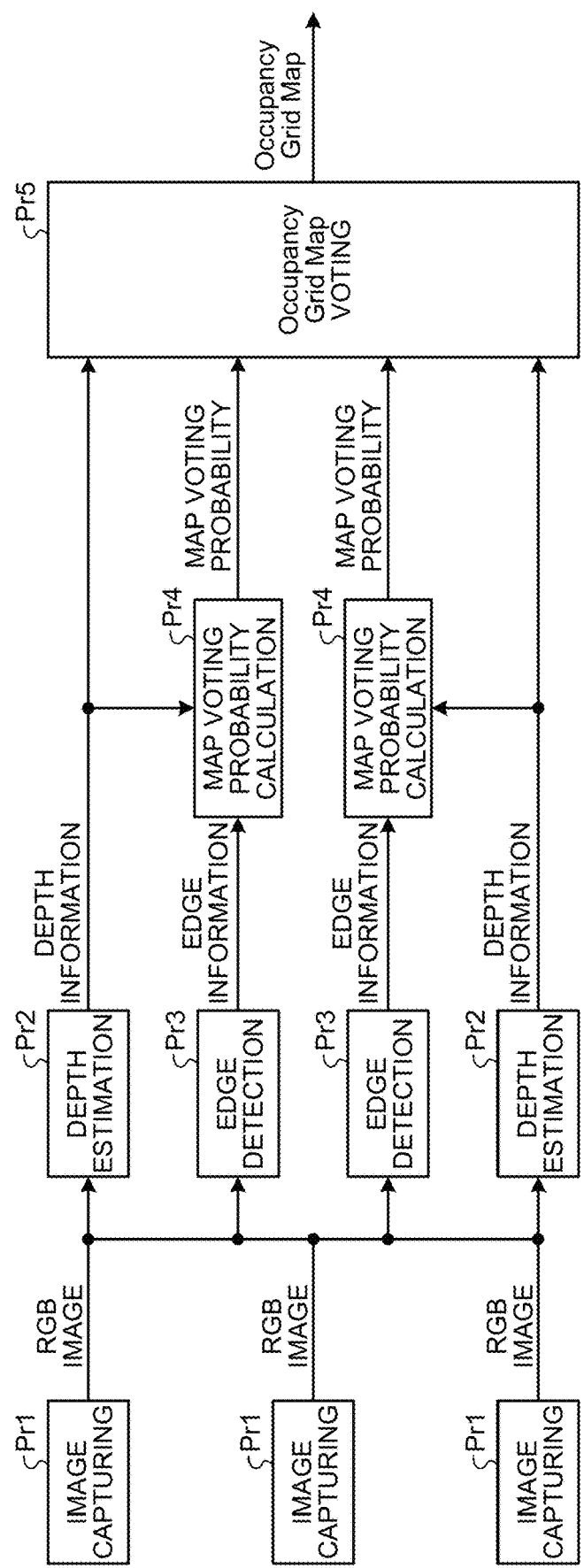
FIG. 9 is a diagram illustrating an overview of information processing by the information processing apparatus according to the first embodiment of the present disclosure.

Next, referring to FIGS. 9 to 16, a description will be given of an overview of processing of the information processing apparatus 1 according to the present embodiment. As illustrated in FIG. 9, the information processing apparatus 1 implements image capturing processing Pr1, depth estimation processing Pr2, edge detection processing Pr3, map voting probability calculation processing Pr4 and map voting processing Pr5 in this order.

(Image Capturing Processing Pr1)

In the image capturing processing Pr1, the imaging units 10*a*, 10*b*, and 10*c* capture RGB images for example, and output the captured RGB images to the depth estimation unit 21 and the edge detection unit 22.

(Depth Estimation Processing Pr2)

In the depth estimation processing Pr2, the depth estimation unit 21 estimates the depth of the object included in the RGB images, and outputs the estimated depth information to the object detection unit 23.

(Edge Detection Processing Pr3)

Figure 10:
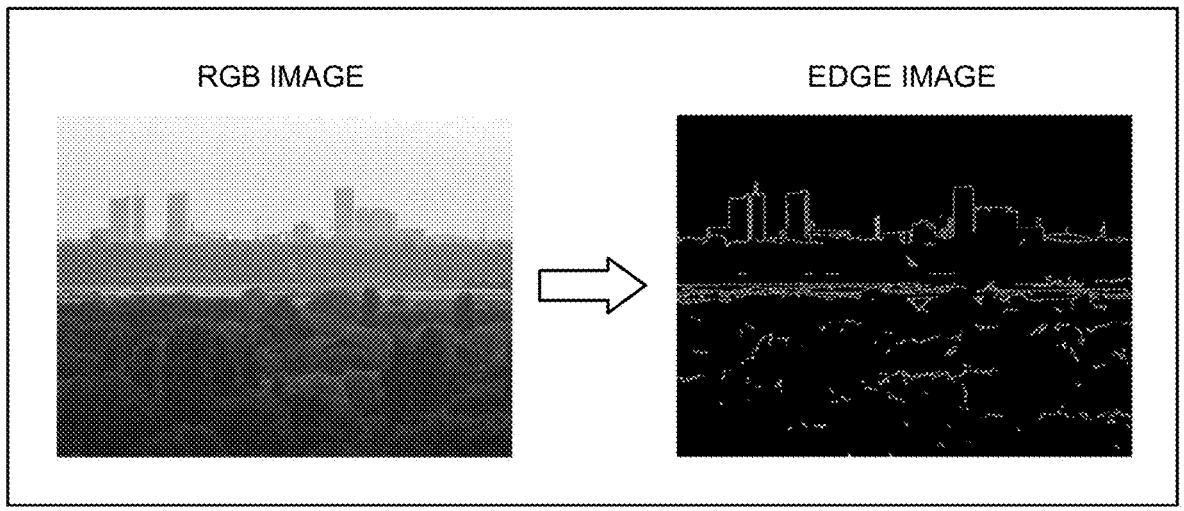
FIG. 10 is a view illustrating a state of generating an edge image from an RGB image in the information processing performed by the information processing apparatus according to the first embodiment of the present disclosure.

In the edge detection processing Pr3, the edge detection unit 22 detects the edge of the object included in the RGB images. In the edge detection processing Pr3, as illustrated in FIG. 10 for example, the edge detection unit 22 converts such an RGB image into an edge image, and outputs, to the object detection unit 23, the edge information including information regarding a position and direction of the edge.
(Map Voting Probability Calculation Processing Pr4)

Figure 11:
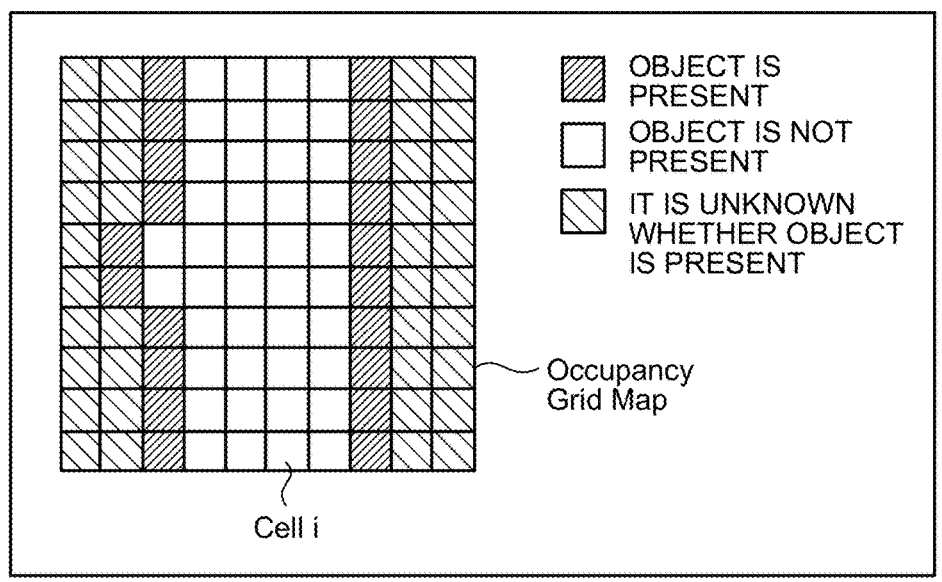
FIG. 11 is a diagram illustrating an example of an occupancy grid map in the information processing performed by the information processing apparatus according to the first embodiment of the present disclosure.

In the map voting probability calculation processing Pr4, the object detection unit 23 calculates a map voting probability of an occupancy grid map. Herein, as illustrated in FIG. 11 for example, the "occupancy grid map" refers to a map, in which a space included in the RGB image is divided into a grid shape and is looked down from above. The unmanned moving body on which the information processing apparatus 1 is mounted grasps whether or not an obstacle is present on a movement path on the basis of this occupancy grid map. In FIG. 11, densely hatched grids indicate "object is present", blank grids indicate "object is not present", and lightly hatched grids indicate that "it is unknown whether object is present".

The map voting probability refers to a probability that the object occupies each grid of the occupancy grid map. A posterior probability (probability that an object occupies a certain grid), for example, of an event in a certain grid (Cell i) in the occupancy grid map illustrated in FIG. 11 can be represented by the following Expression (1).

$$p(m_i|z_{1:t}, x_{1:t}) \quad (1)$$

$$\text{where, } m_i = \begin{cases} 0(\text{Free}) \\ 1(\text{Occupied}) \end{cases}$$

$z_{1:t}$:observation data $x_{1:t}$:self-position

Moreover, the above-described Expression (1) can be calculated by the following Expression (2). That is, a "posterior probability of an event up to time t" can be obtained by multiplying a "posterior probability of the event up to 1 time before" by a "map voting probability based on observation at the current point of time". That is, such a probability owned as the occupancy grid map up to 1 time before is multiplied by the probability based on the current observation, whereby a current occupancy grid map is obtained.

$$p(m_i|z_{1:t},x_{1:t})=p(m_i|z_{1:t-1},x_{1:t-1})\times p(m_i|z_t,x_t) \quad (2)$$

where, $p(m_i|z_{1:t}, x_{1:t})$: posterior probability of an event up to time t $p(m_i|z_{1:t-1}, x_{1:t-i})$: posterior probability of the event up to 1 time before $p(m_i|z_t, x_t)$: map voting probability based on observation at the current point of time In the present embodiment, "$p(m_i|z_t,x_t)$" in the above-described Expression (2) is obtained by the following Expression (3). That is, a "map voting probability based on a distance to an observation event (first probability distribution)" is multiplied by a "map voting probability based on an edge direction of the observation event (second probability distribution)", whereby a "map voting probability based on the observation at the current point of time" is obtained. That is, the map voting probability is obtained three-dimensionally.

$$p(m_i|z_t,x_t)=p(m_i|L_{i,t})\times p(m_i|E_{i,t}) \quad (3)$$

where, $p(m_i|L_t)$: map voting probability based on a distance to an observation event $p(m_i|E_{i,t})$: map voting probability based on an edge direction of the observation event In the map voting probability calculation processing Pr4, the object detection unit 23 calculates the first probability distribution based on the depth estimated by the depth estimation unit 21 and the second probability distribution indicating the reliability of the depth. Herein, the first probability distribution refers to the "map voting probability based on the distance of the observation event" in the above-described Expression (3), and the second probability distribution refers to the "map voting probability based on the edge direction of the observation event" in the above-described Expression (3).

The "reliability of the depth" refers to a probability distribution at a position where the edge of the object is present in the captured image, and a probability distribution having a higher probability as the edge direction with respect to the direction of the baseline length is closer to the right angle.

Figure 12:
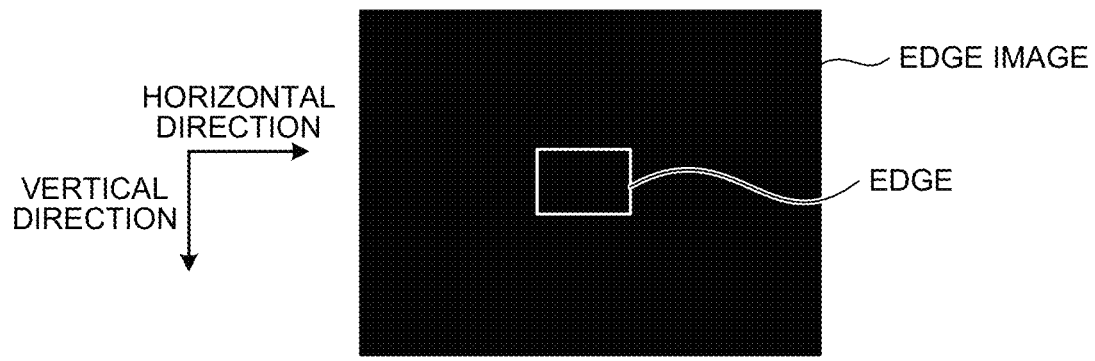
FIG. 12 is a view illustrating an example of the edge image in the information processing performed by the information processing apparatus according to the first embodiment of the present disclosure.
Figure 13:
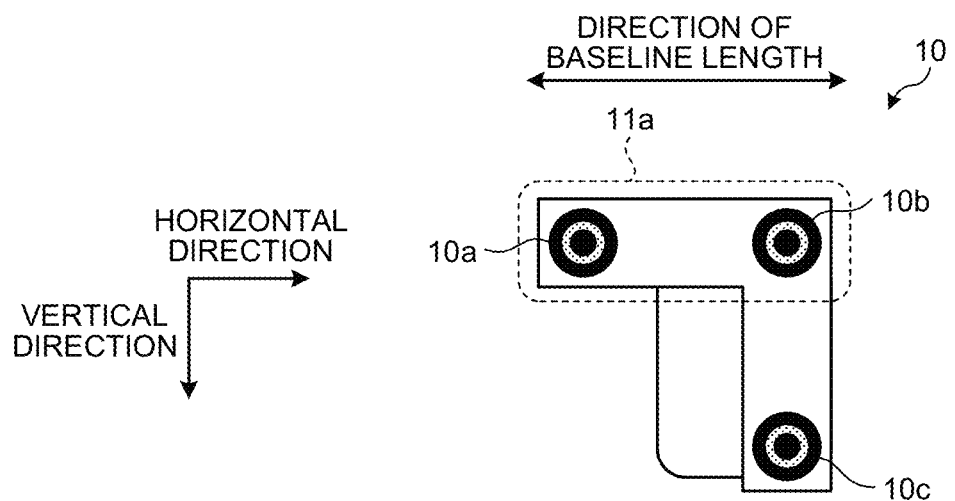
FIG. 13 is a diagram illustrating a first stereo camera in the stereo camera system provided in the information processing apparatus according to the first embodiment of the present disclosure.
Figure 14:
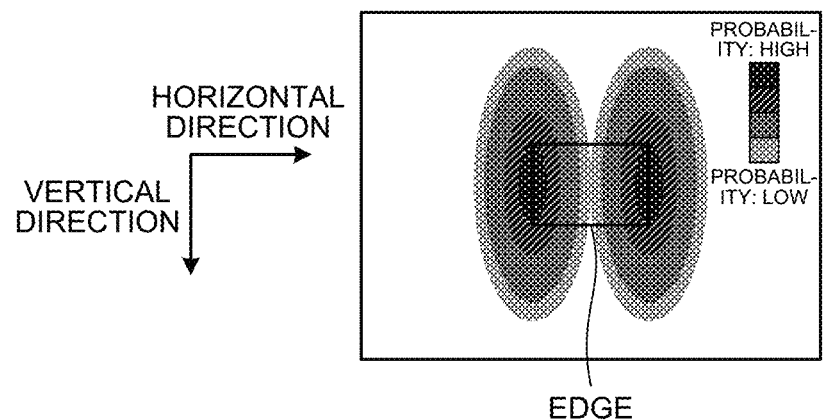
FIG. 14 is a view illustrating an example of a map voting probability (probability distribution) based on an edge direction, the map voting probability corresponding to the first stereo camera, in the information processing performed by the information processing apparatus according to the first embodiment of the present disclosure.
Figure 15:
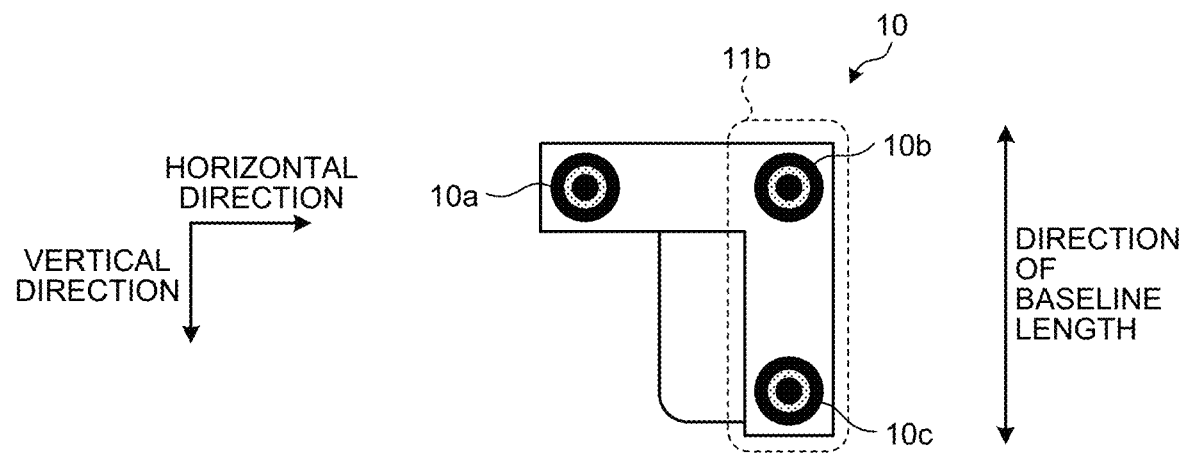
FIG. 15 is a diagram illustrating a second stereo camera in the stereo camera system provided in the information processing apparatus according to the first embodiment of the present disclosure.

For example, a case is considered where edges in the horizontal direction and edges in the vertical direction are detected by the edge detection unit 22, for example, as illustrated in FIG. 12. In this case, a second probability distribution corresponding to the first stereo camera 11a in which the direction of the baseline length is the horizontal direction as illustrated in FIG. 13 becomes such a distribution in which the highest probability overlaps the edges in the vertical direction perpendicular to the baseline length as illustrated in FIG. 14. Meanwhile, a second probability distribution corresponding to the second stereo camera 11b in which the direction of the baseline length is the vertical direction as illustrated in FIG. 15 becomes such a distribution in which the highest probability overlaps the edges in the horizontal direction perpendicular to the baseline length as illustrated in FIG. 16.

Figure 16:
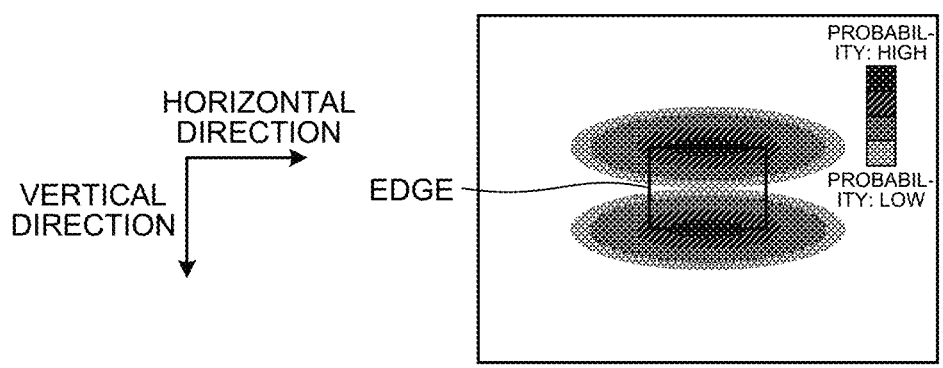
FIG. 16 is a view illustrating an example of a map voting probability (probability distribution) based on the edge direction, the map voting probability corresponding to the second stereo camera, in the information processing performed by the information processing apparatus according to the first embodiment of the present disclosure.

As described above, in the map voting probability calculation processing Pr4, such reliabilities indicating how reliable the depths are, the depths being estimated from the captured images of the first and second stereo cameras 11a and 11b, are approximated as such two-dimensional normal distributions as illustrated in FIGS. 14 and 16 for example.

In the map voting probability calculation processing Pr4, the object detection unit 23 calculates the map voting probability in the occupancy grid map on the basis of the first probability distribution and the second probability distribution. That is, as shown in the above-described Expression (3), the object detection unit 23 multiplies the first probability distribution (the map voting probability based on the distance to the object) and the second probability distribution (the map voting probability based on the edge direction of the object) by each other, and thereby calculates the map voting probability.

(Map Voting Processing Pr5)

In the map voting processing Pr5, the object detection unit 23 casts a vote on each grid on the basis of the calculated map voting probability, and thereby creates the occupancy grid map. The information processing apparatus 1 detects the object on the basis of the occupancy grid map thus created.

<2-3. Flow of Processing>

Figure 17:
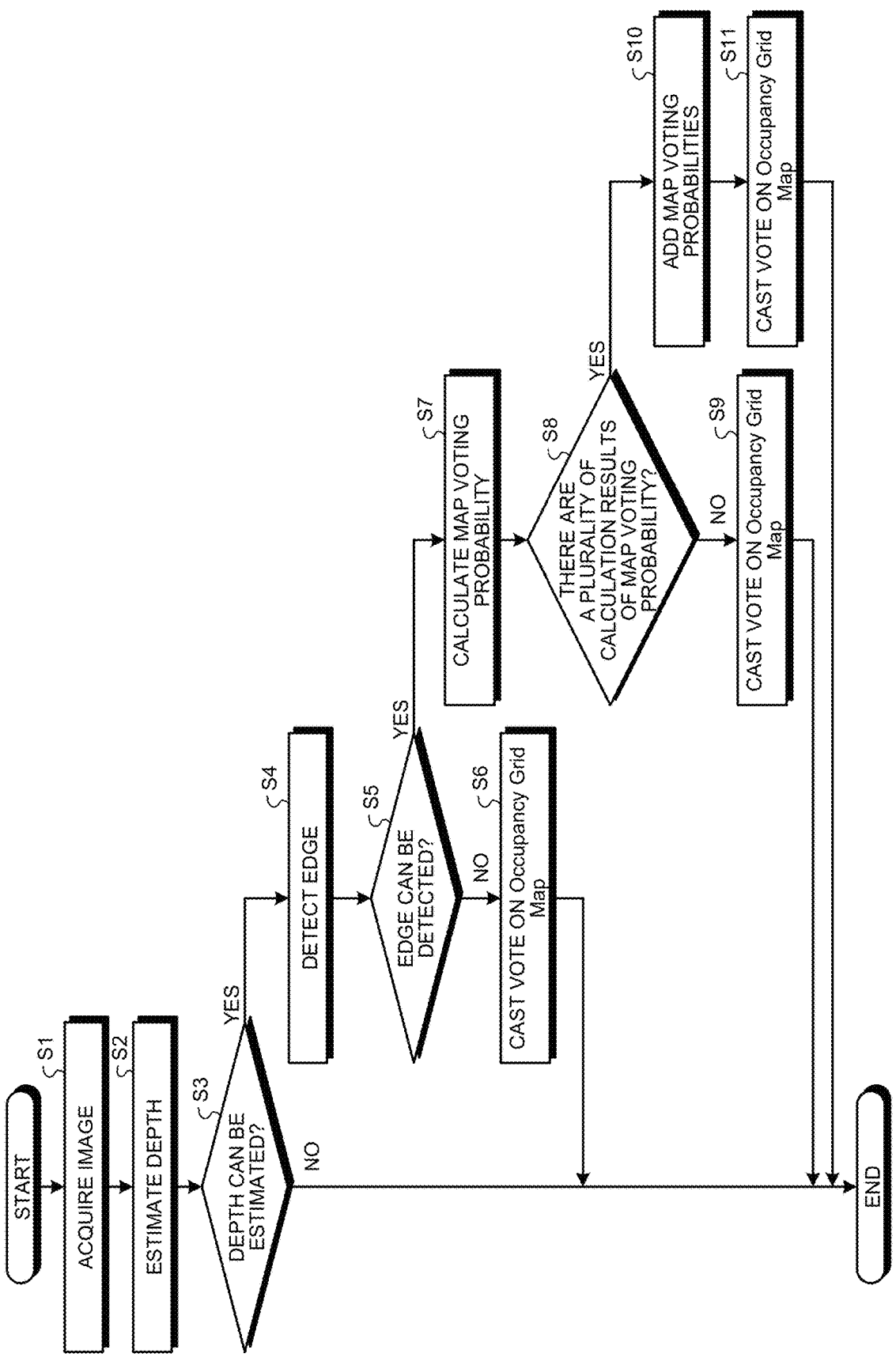
FIG. 17 is a flowchart illustrating an example of the information processing performed by the information processing apparatus according to the first embodiment of the present disclosure.
Figure 18:
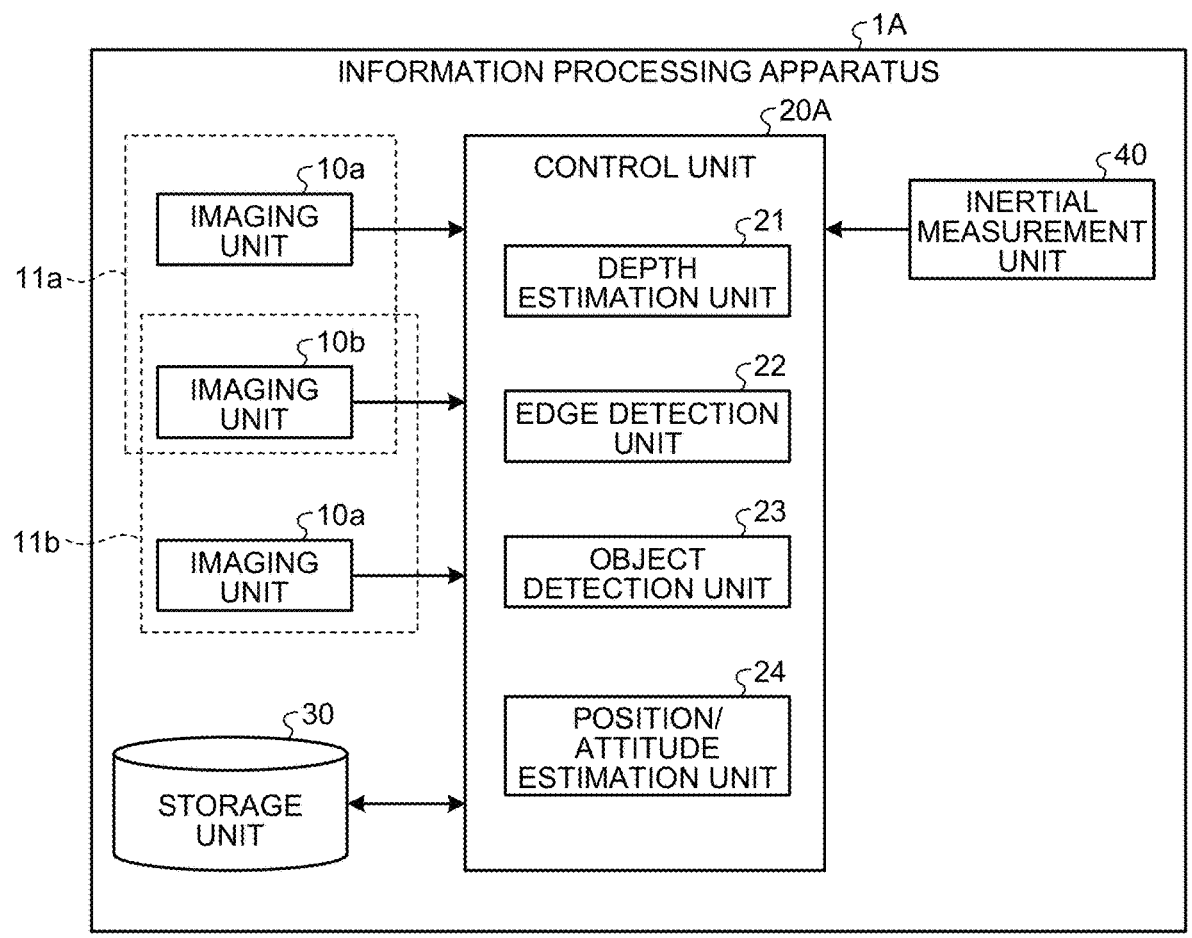
FIG. 18 is a block diagram illustrating a configuration of an information processing apparatus according to a second embodiment of the present disclosure.

Next, referring to FIG. 17, a description will be given of a flow of the processing of the information processing apparatus 1 according to the present embodiment. First, the control unit 20 acquires the images captured by the first and second stereo cameras 11a and 11b (Step S1). Subsequently, the depth estimation unit 21 of the control unit 20 estimates the depth of the object included in the captured images (Step S2).

Subsequently, the control unit 20 determines whether or not the depth has been able to be appropriately estimated by the depth estimation unit 21 (Step S3). In the case of determining that the depth has not been able to be appropriately estimated (No in Step S3), the control unit 20 ends this processing. Meanwhile, in the case of determining that the depth has been able to be appropriately estimated (Yes in Step S3), the edge detection unit 22 of the control unit 20 detects the edge of the object included in the captured image (Step S4).

Subsequently, the control unit 20 determines whether or not the edge has been able to be appropriately detected by the edge detection unit 22 (Step S5). In the case of determining that the edge has not been able to be appropriately detected (No in Step S5), the object detection unit 23 of the control unit 20 casts a vote on the occupancy grid map (Step S6), and ends this processing. Meanwhile, in the case of determining that the edge has been able to be appropriately detected (Yes in Step S5), the object detection unit 23 calculates the map voting probability on the basis of the above-described Expressions (1) to (3) (Step S7).

Subsequently, the object detection unit 23 determines whether or not there are a plurality of calculation results of the map voting probability (Step S8). Note that "there are a plurality of calculation results of the map voting probability" refers, for example, to such a case where individually calculated are the map voting probability corresponding to the first stereo camera 11a in which the direction of the baseline length illustrated in FIG. 13 is the horizontal direction and the map voting probability corresponding to the second stereo camera 11b in which the direction of the baseline length illustrated in FIG. 15 is the vertical direction.

In the case of determining in Step S8 that there are not a plurality of the calculation results of the map voting probability (No in Step S8), the object detection unit 23 casts a vote on the occupancy grid map on the basis of the calculated map voting probability (Step S9), and ends this processing.

In the case of determining in Step S8 that there are a plurality of the calculation results of the map voting probability (Yes in Step S8), the object detection unit 23 multiplies and adds the plurality of map voting probabilities by and to one another (Step S10). Subsequently, the object detection unit 23 casts a vote on the occupancy grid map on the basis of the added-up map voting probability (Step S11), and ends this processing.

3. Second Embodiment

Next, referring to FIGS. 18 to 22, a description will be given of an information processing apparatus 1A according to a second embodiment. The information processing apparatus 1A includes an inertial measurement unit 40 in addition to the respective constituents of the above-described information processing apparatus 1. Moreover, a control unit 20A of the information processing apparatus 1A includes a position/attitude estimation unit 24 in addition to the respective constituents of the above-described control unit 20.

The inertial measurement unit 40 is composed of an inertial measurement unit (IMU) including, for example, a three-axis acceleration sensor, a three-axis gyro sensor, and the like, and outputs acquired sensor information to the position/attitude estimation unit 24 of the control unit 20A. The position/attitude estimation unit 24 detects a position and attitude (for example, an orientation, an inclination, and the like) of an unmanned moving body, on which the information processing apparatus 1A is mounted, on the basis of the captured images captured by the imaging units 10a, 10b, and 10c and the sensor information input from the inertial measurement unit 40. Note that a method for detecting the position and attitude of the unmanned moving body is not limited to a method using the above-described IMU.

The object detection unit 23 in the present embodiment registers, as a key frame, the second probability distribution calculated in the previous frame (that is, the map voting probability based on the edge direction of the object), and when the positions and attitudes of the first and second stereo cameras 11a and 11b are changed in the current frame, deforms (moves and rotates for example) the key frame on the basis of variations of the positions and attitudes of the first and second stereo cameras 11a and 11b, and thereby calculates the second probability distribution.

Figure 19:
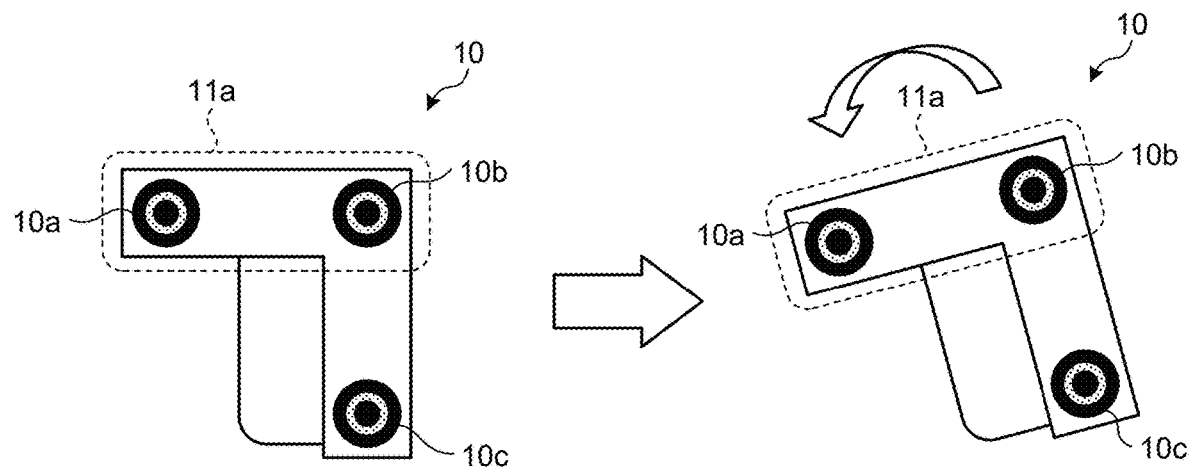
FIG. 19 is a diagram illustrating a state where a position and attitude of the stereo camera system are changed in information processing performed by the information processing apparatus according to the second embodiment of the present disclosure.
Figure 20:
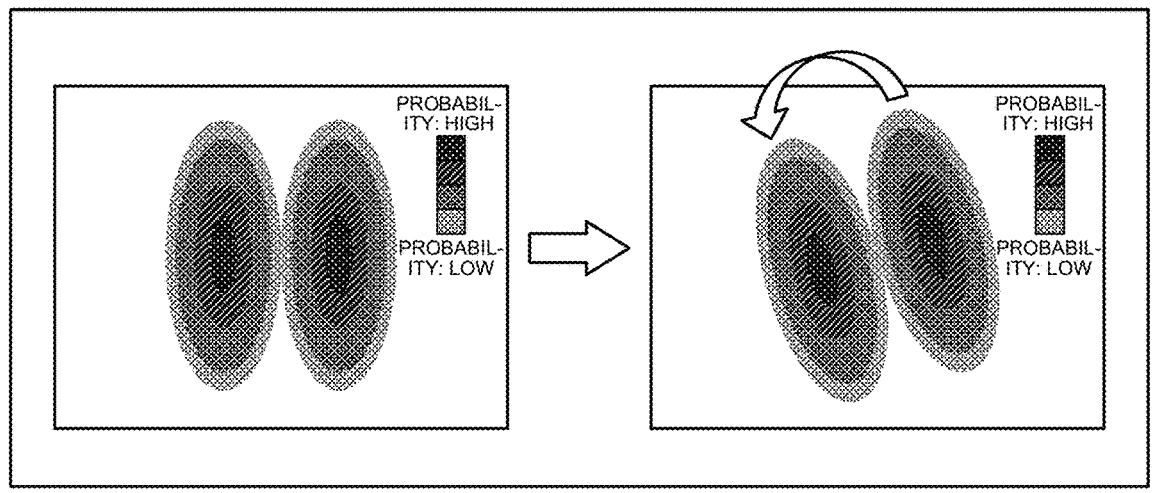
FIG. 20 is a view illustrating an example of deformation of the map voting probability (probability distribution), the deformation being based on the edge direction when the position and attitude of the stereo camera system are changed, in the information processing performed by the information processing apparatus according to the second embodiment of the present disclosure.

If the second probability distribution is recalculated every time when the attitude of the stereo camera system 10 is changed as illustrated in FIG. 19, for example, while the unmanned moving body is flying, then a processing load of the information processing apparatus 1A may increase. In this connection, the object detection unit 23 of the information processing apparatus 1A preregisters, as a key frame, the second probability distribution calculated in the previous frame. Then, when the attitude of the stereo camera system 10 is changed in the next frame (current frame), the object detection unit 23 rotates the corresponding key frame (second probability distribution) as illustrated in FIG. 20 in accordance with the variation of the attitude of the subject machine, which is estimated by the position/attitude estimation unit 24, and thereby calculates the second probability distribution of the current frame. Subsequently, the object detection unit 23 multiplies the calculated second probability distribution and the first probability distribution by each other, and thereby calculates the map voting probability. Note that, when the variations of the position and attitude of the subject machine, which are estimated by the position/attitude estimation unit 24, are equal to or greater than predetermined threshold values, the object detection unit 23 recalculates the second probability distribution, and reregisters, as a key frame, the calculated second probability distribution.

Figure 21:
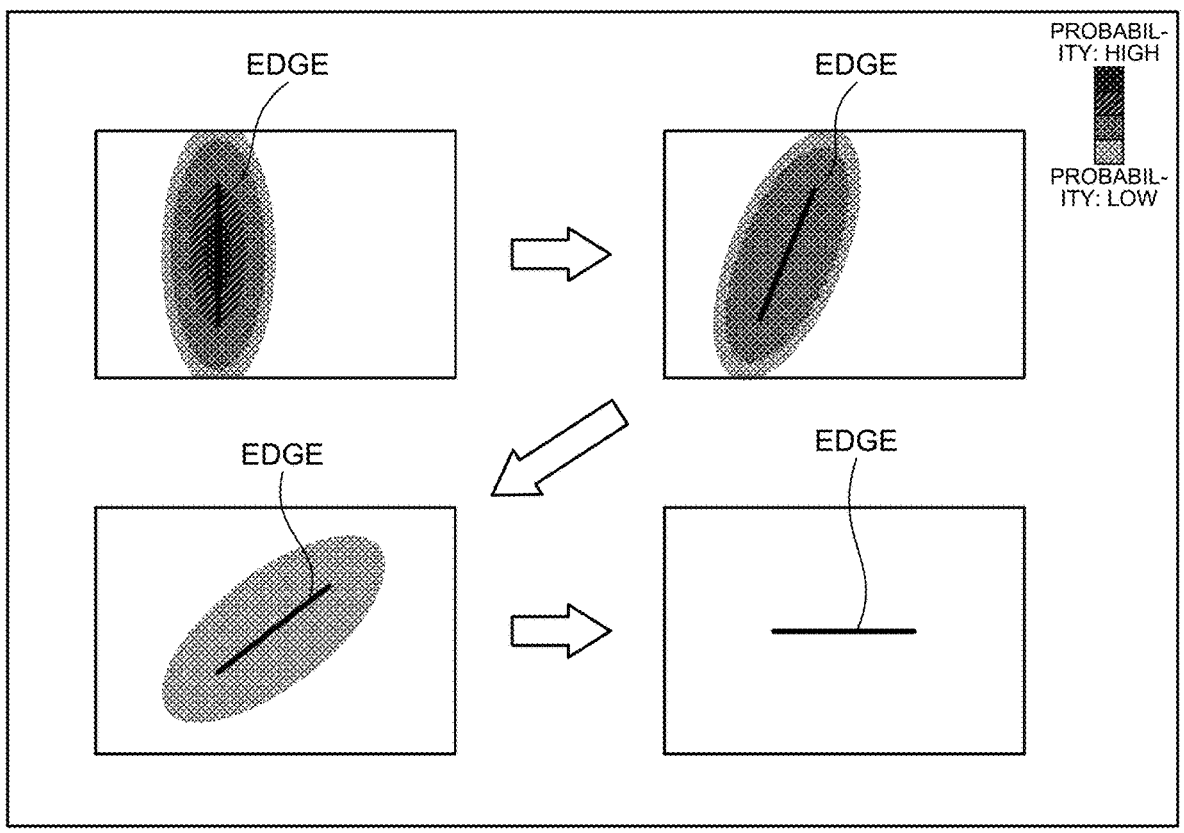
FIG. 21 is a view illustrating an example of the deformation of the map voting probability (probability distribution), the deformation being based on the edge direction when the position and attitude of the stereo camera system are changed, in the information processing performed by the information processing apparatus according to the second embodiment of the present disclosure.

Referring to FIG. 21, a description will be given below of an example of the deformation of the second probability distribution, in which the changes of the position and attitude of the subject machine are considered. When the second probability distribution is approximated by a two-dimensional normal distribution of a periphery of the edge as illustrated in FIG. 21 for example, this normal distribution can be represented by values of an x average, a y average, an edge horizontal dispersion, an edge vertical dispersion, an inclination, a size of the entire distribution, and the like. These values are changed in accordance with an angle of the edge and the variations of the position and attitude of the subject machine. Note that, from a distance to the edge and parameters of the imaging units 10a, 10b, and 10c, it is possible to estimate how the edge moves in the image.

For example, when the direction of the baseline length of the first stereo camera 11a is the horizontal direction (see FIG. 13), then as illustrated in FIG. 21, both of the dispersions (the edge horizontal dispersion, the edge vertical dispersion) are increased more as the angle of the edge with respect to the direction of the baseline length becomes smaller. Moreover, the size of the entire distribution is reduced as the angle of the edge with respect to the direction of the baseline length becomes smaller.

The information processing apparatus 1A performs such process as described above, can thereby reduce a calculation frequency of the second probability distribution (the map voting probability based on the edge direction of the object), and can therefore reduce the processing load.

Figure 22:
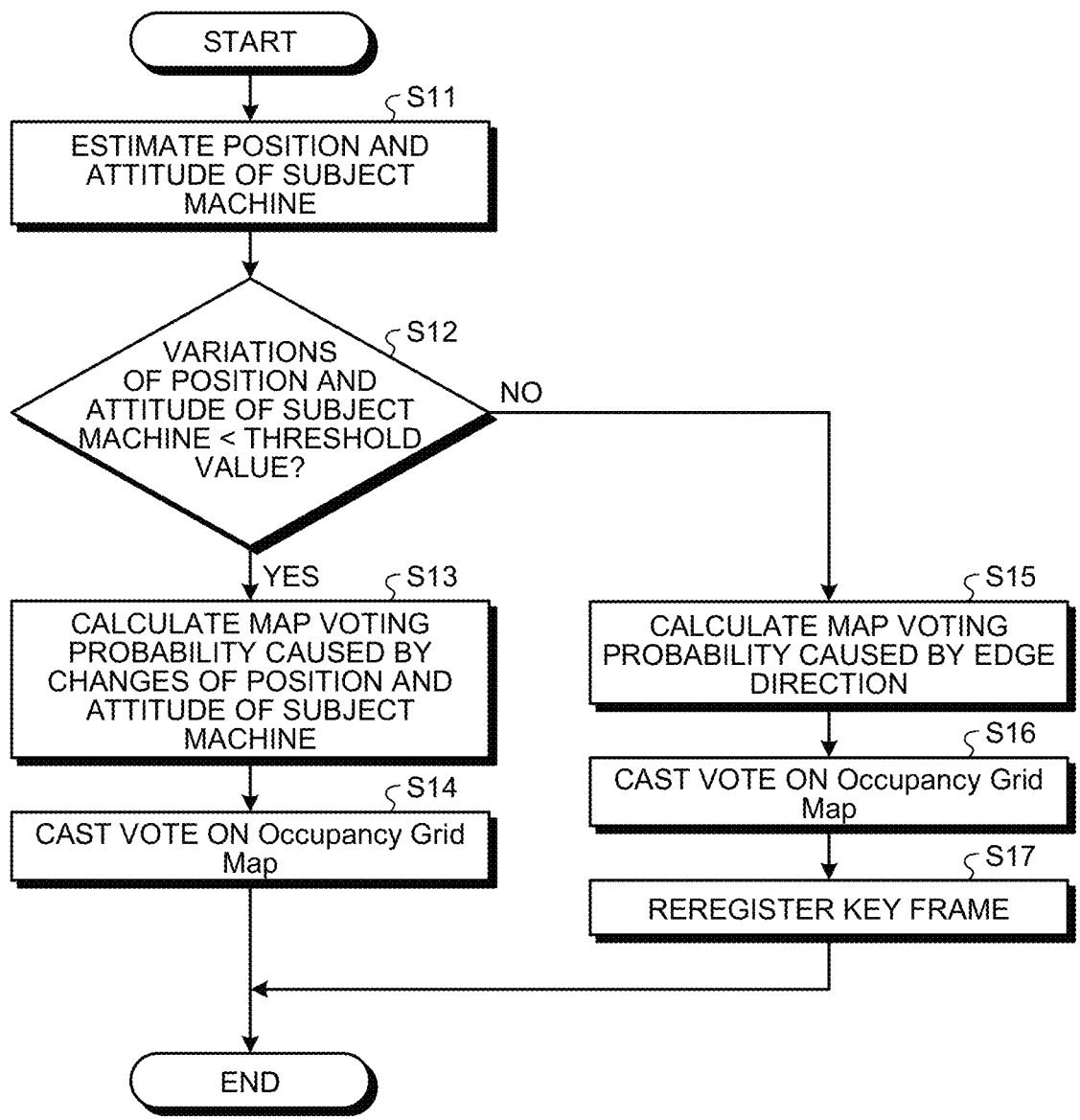
FIG. 22 is a flowchart illustrating an example of the information processing performed by the information processing apparatus according to the second embodiment of the present disclosure.

Next, referring to FIG. 22, a description will be given of a flow of the processing of the information processing apparatus 1A according to the present embodiment. First, the position/attitude estimation unit 24 of the control unit 20A estimates the position and attitude of the subject machine (Step S11). Subsequently, the control unit 20A determines whether or not the variations of the position and attitude of the subject machine, which are estimated by the position/attitude estimation unit 24, are less than the predetermined threshold values (Step S12).

When the variations of the position and attitude of the subject machine, which are estimated by the position/attitude estimation unit 24 of the control unit 20A, are less than the predetermined threshold values in Step S12 (Yes in Step S12), the object detection unit 23 calculates the map voting probability caused by the changes of the position and attitude of the subject machine (Step S13). In Step S13, the object detection unit 23 deforms the preregistered key frame in accordance with the variations of the position and attitude of the subject machine, and thereby calculates the second probability distribution. Then, the object detection unit 23 multiplies the calculated second probability distribution and the first probability distribution by each other, and thereby calculates the map voting probability. Subsequently, the object detection unit 23 casts a vote on the occupancy grid map (Step S14), and ends this processing.

When the variations of the position and attitude of the subject machine, which are estimated by the position/attitude estimation unit 24 of the control unit 20A, are equal to or greater than the predetermined threshold values in Step S12 (No in Step S12), the object detection unit 23 calculates the map voting probability caused by the edge direction (Step S15). In Step S15, the object detection unit 23 calculates the second probability distribution one more time, and multiplies the calculated second probability distribution and the first probability distribution by each other, and thereby calculates the map voting probability. Subsequently, the object detection unit 23 casts a vote on the occupancy grid map (Step S16), and reregisters the second probability distribution as a key frame (Step S17), and ends this processing.

4. Modified Example of Second Embodiment

Figure 23:
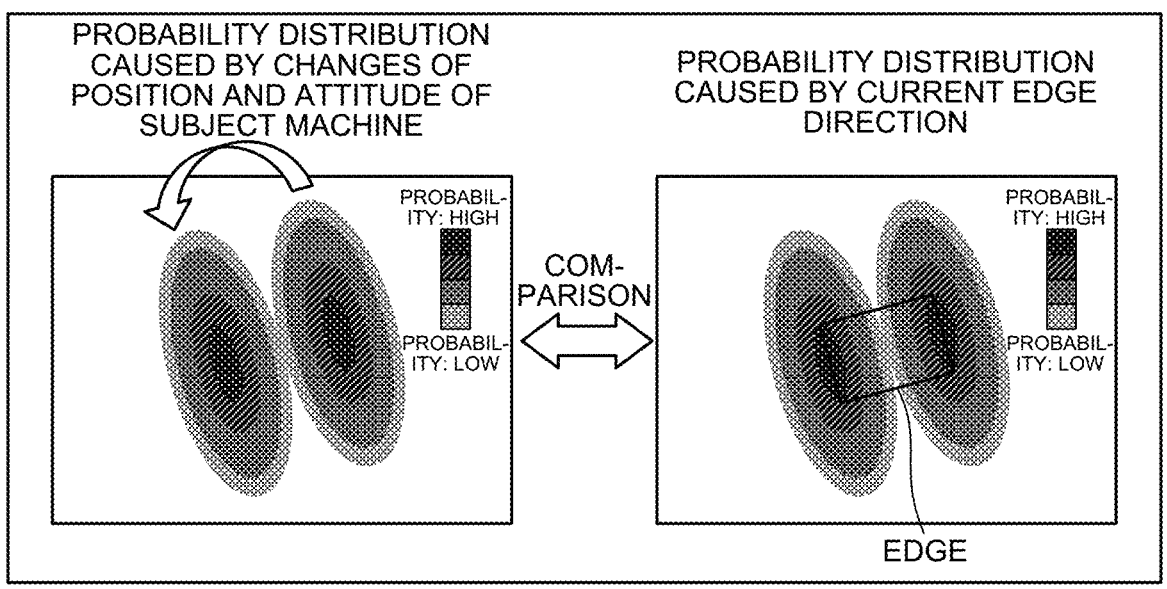
FIG. 23 is a view illustrating an example of deformation of a map voting probability (probability distribution), the deformation being based on an edge direction when a position and attitude of a stereo camera system are changed, in a modified example of the information processing performed by the information processing apparatus according to the second embodiment of the present disclosure.
Figure 24:
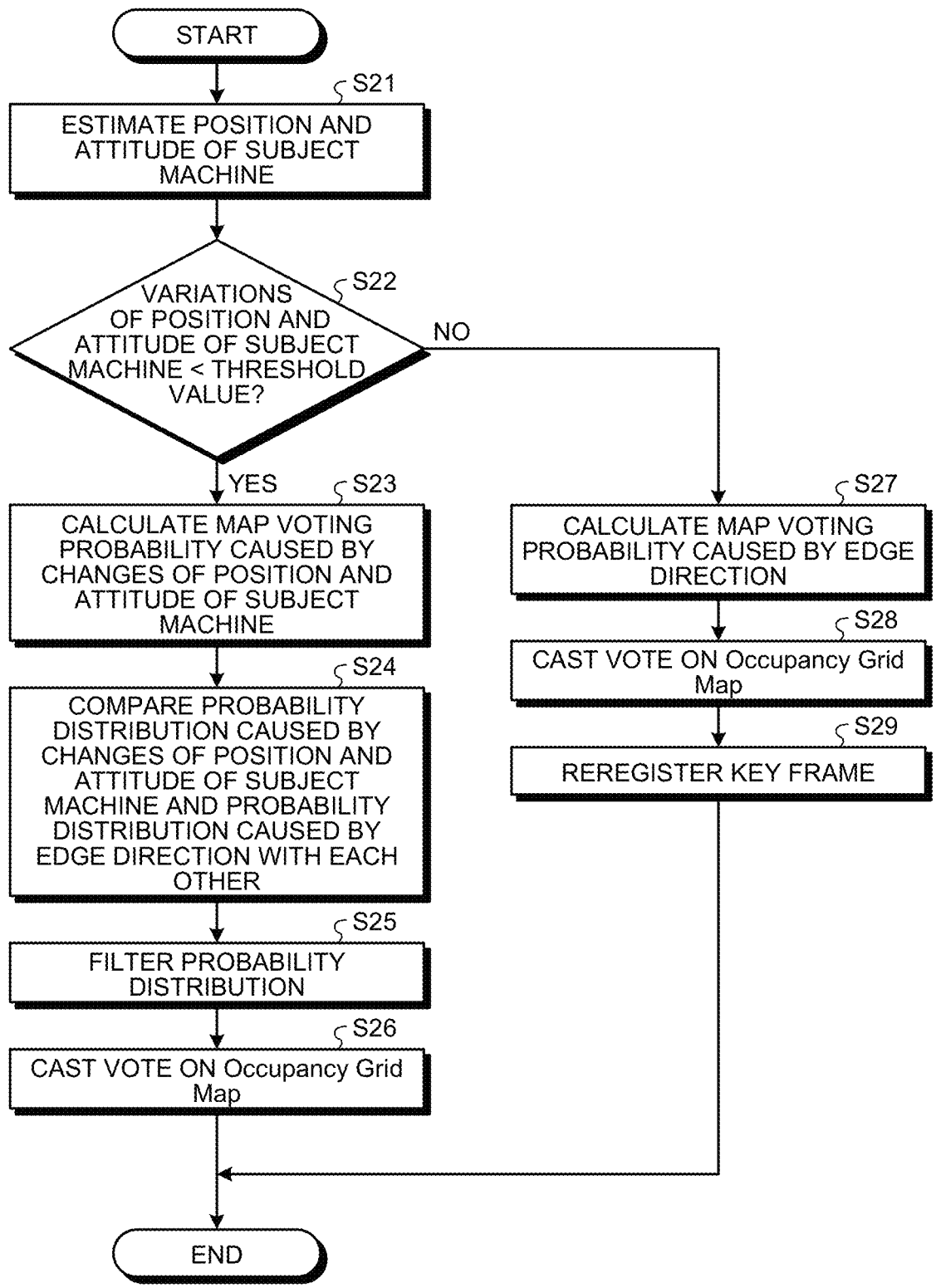
FIG. 24 is a flowchart illustrating an example of the modified example of the information processing performed by the information processing apparatus according to the second embodiment of the present disclosure.

Next, referring to FIGS. 23 and 24, a description will be given of a modified example of the information processing apparatus 1A according to the second embodiment. A configuration of the information processing apparatus 1A according to the present embodiment is similar to that in FIG. 18, and accordingly, an illustration thereof will be omitted.

The object detection unit 23 in the present embodiment compares the second probability distribution calculated by deforming the key frame and the second probability distribution calculated in the current frame with each other, and thereby filters the second probability distribution. That is, as illustrated in FIG. 23, the object detection unit 23 compares the second probability distribution calculated due to the changes of the position and attitude of the subject machine and the second probability distribution calculated due to the current edge direction with each other, eliminates such a probability distribution extremely different from others and a probability distribution with a feeling of wrongness, and thereby enhances stability of the object detection.

Next, referring to FIG. 24, a description will be given of a flow of the processing of the information processing apparatus 1A according to the present embodiment. First, the position/attitude estimation unit 24 of the control unit 20A estimates the position and attitude of the subject machine (Step S21). Subsequently, the control unit 20A determines whether or not the variations of the position and attitude of the subject machine, which are estimated by the position/attitude estimation unit 24, are less than the predetermined threshold values (Step S22).

When the variations of the position and attitude of the subject machine, which are estimated by the position/attitude estimation unit 24 of the control unit 20A, are less than the predetermined threshold values in Step S22 (Yes in Step S22), the object detection unit 23 calculates the map voting probability caused by the changes of the position and attitude of the subject machine (Step S23). In Step S23, the object detection unit 23 deforms the preregistered key frame in accordance with the variations of the position and attitude of the subject machine, and thereby calculates the second probability distribution. Then, the object detection unit 23 multiplies the calculated second probability distribution and the first probability distribution by each other, and thereby calculates the map voting probability.

Subsequently, the object detection unit 23 compares the second probability distribution calculated due to the changes of the position and attitude of the subject machine and the second probability distribution calculated due to the current edge direction with each other (Step S24), and filters the probability distribution extremely different from others (Step S25). Subsequently, the object detection unit 23 casts a vote on the occupancy grid map (Step S26), and ends this processing.

When the variations of the position and attitude of the subject machine, which are estimated by the position/attitude estimation unit 24 of the control unit 20A, are equal to or greater than the predetermined threshold values in Step S22 (No in Step S22), the object detection unit 23 calculates the map voting probability caused by the edge direction (Step S27). In Step S27, the object detection unit 23 calculates the second probability distribution one more time, and multiplies the calculated second probability distribution and the first probability distribution by each other, and thereby calculates the map voting probability. Subsequently, the object detection unit 23 casts a vote on the occupancy grid map (Step S28), and reregisters the second probability distribution as a key frame (Step S29), and ends this processing.

5. Hardware Configuration Example

Figure 25:
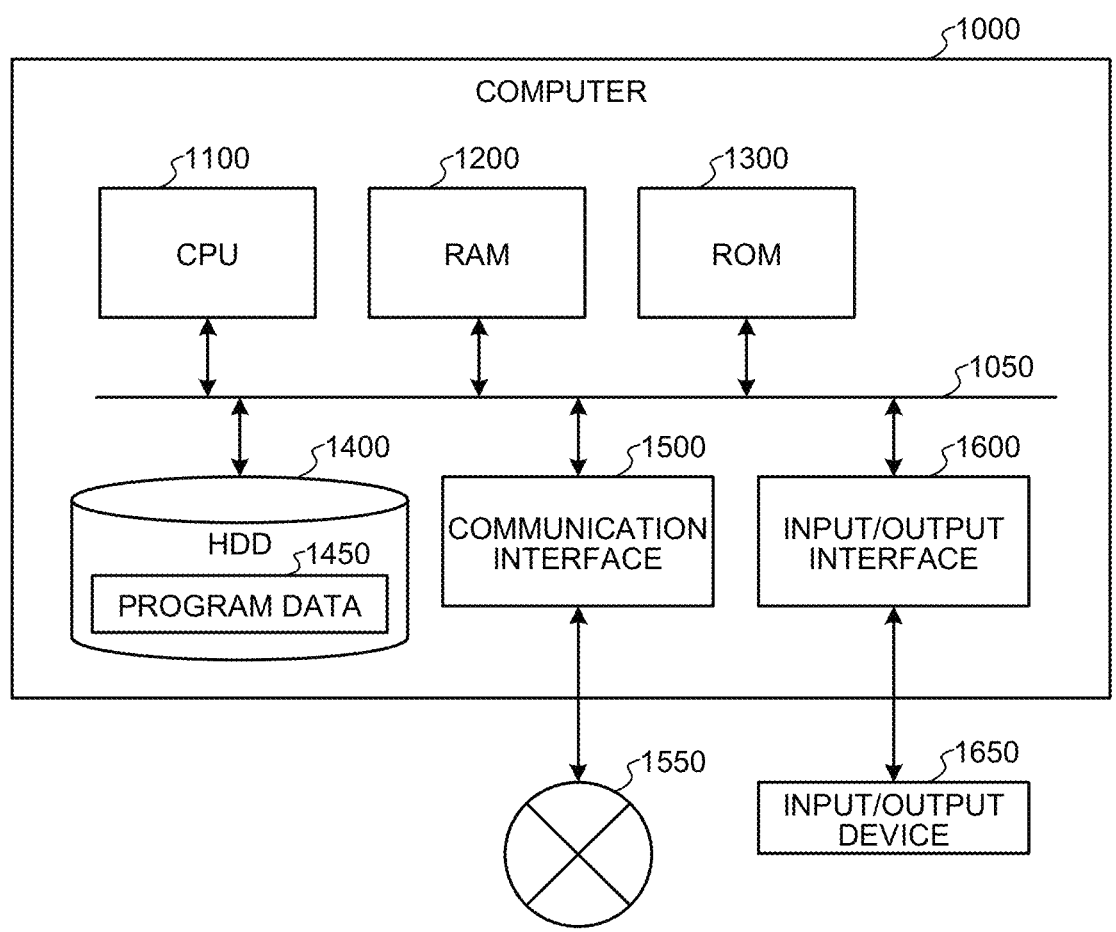
FIG. 25 is an explanatory diagram illustrating a hardware configuration example illustrating an example of a computer that achieves functions of the information processing apparatus according to the embodiments of the present disclosure.

Such an information instrument as the information processing apparatuses 1, 1A, and the like according to the above-described embodiments is achieved, for example, by a computer 1000 with a configuration as illustrated in FIG. 25. The computer 1000 includes a CPU 1100, a RAM 1200, a read only memory (ROM) 1300, a hard disk drive (HDD) 1400, a communication interface 1500, and an input/output interface 1600. The respective units of the computer 1000 are connected to one another by a bus 1050.

The CPU 1100 operates on the basis of programs stored in the ROM 1300 or the HDD 1400 and controls the respective units. For example, the CPU 1100 unfolds, in the RAM 1200, the programs stored in the ROM 1300 or the HDD 1400, and executes processing each of which corresponds to each of a variety of the programs.

The ROM 1300 stores a boot program such as a basic input output system (BIOS) to be executed by the CPU 1100 at the time when the computer 1000 starts up, a program that depends on hardware of the computer 1000, and the like.

The HDD 1400 is a computer-readable recording medium that non-temporarily records the programs to be executed by the CPU 1100, data to be used by the programs, and the like. Specifically, the HDD 1400 is a recording medium that records an information processing program according to the present disclosure, which is an example of program data 1450.

The communication interface 1500 is an interface for causing the computer 1000 to connect to an external network 1550 (the Internet for example). For example, via the communication interface 1500, the CPU 1100 receives data from another instrument, and transmits data, which is generated by the CPU 1100, to another instrument.

The input/output interface 1600 is an interface for connecting an input/output device 1650 and the computer 1000 to each other. For example, via the input/output interface 1600, the CPU 1100 receives data from an input device such as a keyboard and a mouse. Moreover, via the input/output interface 1600, the CPU 1100 transmits data to an output device such as a display, a speaker, and a printer. Further, the input/output interface 1600 may function as a media interface that reads a program and the like which are recorded in a predetermined recording medium. For example, the medium is an optical recording medium such as a digital versatile disc (DVD) and a phase change rewritable disk (PD), a magneto-optical recording medium such as a magneto-optical disk (MO), a tape medium, a magnetic recording medium, a semiconductor memory, or the like.

For example, when the computer 1000 functions as the information processing apparatuses 1 and 1A according to the embodiments, the CPU 1100 of the computer 1000 executes the information processing program loaded onto the RAM 1200, and thereby achieves the functions of the control unit 130 and the like. Moreover, the HDD 1400 stores the information processing program according to the present disclosure, and the data in the storage unit 30. Note that the CPU 1100 reads the program data 1450 from the HDD 1400 and executes the same; however, as another example, the CPU 1100 may acquire these programs from another device via the external network 1550.

6. Effect

The information processing apparatuses 1 and 1A include the first and second stereo cameras 11a and 11b, the depth estimation unit 21, and the object detection unit 23. The first and second stereo cameras 11a and 11b are arranged so that the directions of the respective baseline lengths intersect each other. Moreover, from the captured images captured by the first and second stereo cameras 11a and 11b, the depth estimation unit 21 estimates the depth of the object included in the captured images. Moreover, the object detection unit 23 detects the object on the basis of the depth estimated by the depth estimation unit 21 and the reliability of the depth, which is to be determined in accordance with the angle of the object in the edge direction with respect to the directions of the baseline lengths of the first and second stereo cameras 11a and 11b.

Thus, by using the reliability of the depth, which is to be determined in accordance with the angle of the object in the edge direction with respect to the directions of the baseline lengths of the first and second stereo cameras 11a and 11b, the information processing apparatuses 1 and 1A can detect the object with high accuracy regardless of the edge direction. Moreover, the information processing apparatuses 1 and 1A are applied to the unmanned moving body such as a drone for example, and can thereby appropriately recognize horizontal lines such as electric wires, and can avoid a top portion of a building from being recognized to protrude forward. Moreover, according to the information processing apparatuses 1 and 1A, the existing depth estimation system using a stereo camera can be used, and accordingly, the detection accuracy of the object can be improved at low cost.

In the information processing apparatuses 1 and 1A, the reliability of the depth is the probability distribution at the position where the edge of the object is present in the captured image, and the probability distribution having a higher probability as the edge direction with respect to the direction of the baseline length is closer to the right angle.

Thus, the information processing apparatuses 1 and 1A model, to the probability distribution, the reliability of the depth, which is to be determined in accordance with the angle of the object in the edge direction with respect to the directions of the baseline lengths of the first and second stereo cameras 11a and 11b, and can thereby detect the object with high accuracy.

In the information processing apparatuses 1 and 1A, the object detection unit 23 calculates the first probability distribution based on the depth estimated by the depth estimation unit 21 (that is, the map voting probability based on the distance to the object) and the second probability distribution indicating the reliability of the depth (that is, the map voting probability based on the edge direction of the object). On the basis of the first probability distribution and the second probability distribution, the object detection unit 23 calculates the map voting probability indicating the probability that the object occupies each grid in the occupancy grid map in which the space included in the captured image is divided into a grid shape, and casts a vote on each grid on the basis of the map voting probability, and thereby creates the occupancy grid map.

Thus, the information processing apparatuses 1 and 1A create the occupancy grid map, and can thereby grasp the position of the object and the distance to the object.

In the information processing apparatuses 1 and 1A, the object detection unit 23 multiplies the first probability distribution and the second probability distribution by each other, and thereby calculates the map voting probability.

Thus, the information processing apparatuses 1 and 1A can obtain the map voting probability three-dimensionally in consideration of the probability distribution based on the distance to the object and the probability distribution based on the edge direction of the object.

In the information processing apparatus 1A, the object detection unit 23 registers, as a key frame, the second probability distribution calculated in the previous frame (that is, the map voting probability based on the edge direction of the object), and when the positions and attitudes of the first and second stereo cameras 11a and 11b are changed in the current frame, deforms the key frame on the basis of the variations of the positions and attitudes of the first and second stereo cameras 11a and 11b, and thereby calculates a second probability distribution.

Thus, the information processing apparatus 1A can reduce a calculation amount by using the information regarding the movement and rotation of the subject machine (the first and second stereo cameras 11a and 11b), and accordingly, reduces the processing load.

In the information processing apparatus 1A, the object detection unit 23 compares the second probability distribution (the map voting probability based on the edge direction of the object) calculated by deforming the key frame and the second probability distribution calculated in the current frame with each other, and thereby filters the second probability distribution.

Thus, the information processing apparatus 1A filters the probability distribution extremely different from others and the probability distribution with a feeling of wrongness, and can thereby enhance the stability of the object detection.

In the information processing apparatuses 1 and 1A, the first and second stereo cameras 11a and 11b include the first stereo camera 11a and the second stereo camera 11b, and the first and second stereo cameras 11a and 11b are arranged so that the direction of the baseline length of the first stereo camera 11a and the direction of the baseline length of the second stereo camera 11b are perpendicular to each other.

Thus, by the fact that the first and second stereo cameras 11a and 11b are arranged so that the direction of the baseline length of the first stereo camera 11a and the direction of the baseline length of the second stereo camera 11b are perpendicular to each other, the information processing apparatuses 1 and 1A can detect the object with high accuracy regardless of the edge direction.

An information processing method includes: estimating, from the captured images captured by the first and second stereo cameras 11a and 11b arranged so that the directions of the respective baseline lengths thereof intersect each other, the depth of the object included in the captured images; and detecting the object on the basis of the depth and the reliability of the depth, which is to be determined in accordance with the angle of the object in the edge direction with respect to the directions of the baseline lengths of the first and second stereo cameras 11a and 11b.

Thus, by using the reliability of the depth, which is to be determined in accordance with the edge direction of the object, the information processing method can detect the object with high accuracy regardless of the edge direction. Moreover, the information processing method is applied to the unmanned moving body such as a drone for example, and can thereby appropriately recognize horizontal lines such as electric wires, and can avoid a top portion of a building from being recognized to protrude forward. Moreover, according to the information processing method, the existing depth estimation system using a stereo camera can be used, and accordingly, the detection accuracy of the object can be improved at low cost.

An information processing program causes a computer to function as the depth estimation unit 21, the edge detection unit 22, and the object detection unit 23. From the captured images captured by the first and second stereo cameras 11a and 11b arranged so that the directions of the respective baseline lengths thereof intersect each other, the depth estimation unit 21 estimates the depth of the object included in the captured images. Moreover, the object detection unit 23 detects the object on the basis of the depth estimated by the depth estimation unit 21 and the reliability of the depth, which is to be determined in accordance with the angle of the object in the edge direction with respect to the directions of the baseline lengths of the first and second stereo cameras 11a and 11b.

Thus, by using the reliability of the depth, which is to be determined in accordance with the edge direction of the object, the information processing program can detect the object with high accuracy regardless of the edge direction. Moreover, the information processing program is applied to the unmanned moving body such as a drone for example, and can thereby appropriately recognize horizontal lines such as electric wires, and can avoid a top portion of a building from being recognized to protrude forward. Moreover, according to the information processing program, the existing depth estimation system using a stereo camera can be used, and accordingly, the detection accuracy of the object can be improved at low cost.

Note that the effects described in the present specification are merely examples and are not limited, and other effects may be present.

The preferred embodiments of the present disclosure have been described above in detail with reference to the accompanying drawings; however, the technical scope of the present disclosure is not limited to such examples. It is obvious that those having ordinary knowledge in the technical field of the present disclosure can conceive various modifications or alterations within the scope of the technical idea described in the claims, and it is understood that these also naturally fall within the technical scope of the present disclosure.

For example, the stereo camera system 10 of the each of above-described information processing apparatuses 1 and 1A is a trinocular camera system provided with the three imaging units 10a, 10b, and 10c (see FIG. 7); however, the number of imaging units may be four or more. Moreover, in each of the above-described information processing apparatuses 1 and 1A, the probability distribution indicating the reliability of the depth is represented by the two-dimensional normal distribution (see FIGS. 14 and 16), but may be represented by others than the two-dimensional normal distribution.

Moreover, in the above-described information processing apparatuses 1 and 1A, the edge of the object is detected by the edge detection unit 22, and the reliability of the depth is determined in accordance with the angle of the object in the edge direction with respect to the directions of the baseline lengths of the first and second stereo cameras 11a and 11b; however, an edge line of the object, which is other than the edge, may be detected, and the reliability of the depth may be determined in accordance with an angle of the object in a direction of the edge line with respect to the above-described directions of the baseline lengths. For example, the edge line of the object, which is other than the edge, includes a continuous line that indicates a boundary between colors, patterns, or the like in the object, and the like.

Further, in the above-described information processing apparatus 1, when there are a plurality of the calculation results of the map voting probability, the plurality of map voting probabilities are multiplied by one another and added to one another (see Step S10 of FIG. 17); however, a vote may be cast on the occupancy grid map on the basis of a map voting probability with a higher probability without adding the map voting probabilities to one another.

Moreover, the above-described information processing apparatuses 1 and 1A can acquire the reliable depth information regardless of the edge direction of the object serving as a subject, and accordingly, can be widely used for purposes other than the creation of the occupancy grid map. For example, the information processing apparatuses 1 and 1A use acquired data as a key frame, and can thereby check whether or not data (data captured by a single stereo may be allowed) captured thereafter has an unnatural portion, or can be used to determine a short-time collision.

Note that the present technology may also adopt such configurations as follows.

(1)

An information processing apparatus comprising:
  a plurality of stereo cameras arranged so that directions of baseline lengths of the stereo cameras intersect each other;

a depth estimation unit that estimates, from captured images captured by the plurality of stereo cameras, a depth of an object included in the captured images; and an object detection unit that detects the object based on the depth estimated by the depth estimation unit and reliability of the depth, the reliability being determined in accordance with an angle of a direction of an edge line of the object with respect to the directions of the baseline lengths of the plurality of stereo cameras.

(2)

The information processing apparatus according to (1), wherein the reliability of the depth is a probability distribution at a position where the edge line of the object is present in the captured image, and a probability distribution having a higher probability as the direction of the edge line with respect to the direction of the baseline length is closer to a right angle.

(3)

The information processing apparatus according to (2) or (2), wherein the object detection unit calculates a first probability distribution based on the depth estimated by the depth estimation unit and a second probability distribution indicating the reliability of the depth, based on the first probability distribution and the second probability distribution, calculates a map voting probability indicating a probability that the object occupies each grid in an occupancy grid map in which a space included in the captured image is divided into a grid shape, and casts a vote on each grid based on the map voting probability to create the occupancy grid map.

(4)

The information processing apparatus according to (3), wherein the object detection unit multiplies the first probability distribution and the second probability distribution by each other to calculate the map voting probability.

(5)

The information processing apparatus according to any one of (1) to (4), wherein the object detection unit registers, as a key frame, a second probability distribution calculated in a previous frame, and when positions and attitudes of the plurality of stereo cameras are changed in a current frame, deforms the key frame based on variations of the positions and attitudes of the plurality of stereo cameras to calculate a second probability distribution.

(6)

The information processing apparatus according to any one of (1) to (5), wherein the object detection unit compares the second probability distribution calculated by deforming the key frame and the second probability distribution calculated in the current frame with each other to filter the second probability distribution.

(7)

The information processing apparatus according to any one of (1) to (6), wherein the plurality of stereo cameras include a first stereo camera and a second stereo camera, and the first stereo camera and the second stereo camera are arranged so that a direction of a baseline length of the first stereo camera and a direction of a baseline length of the second stereo camera are perpendicular to each other.

(8)

An information processing method comprising:

estimating, from captured images captured by a plurality of stereo cameras arranged so that directions of baseline lengths of the stereo cameras intersect each other, a depth of an object included in the captured images; and detecting the object based on the depth and reliability of the depth, the reliability being determined in accordance with an angle of a direction of an edge line of the object with respect to the directions of the baseline lengths of the plurality of stereo cameras.

(9)

An information processing program for causing a computer to function as:

a depth estimation unit that estimates, from captured images captured by a plurality of stereo cameras arranged so that directions of baseline lengths of the stereo cameras intersect each other, a depth of an object included in the captured images; and an object detection unit that detects the object based on the depth estimated by the depth estimation unit and reliability of the depth, the reliability being determined in accordance with an angle of a direction of an edge line of the object with respect to the directions of the baseline lengths of the plurality of stereo cameras.

REFERENCE SIGNS LIST 1, 1A INFORMATION PROCESSING APPARATUS
10, 10A, 110 STEREO CAMERA SYSTEM
10a, 10b, 10c, 110a, 110b IMAGING UNIT
11a FIRST STEREO CAMERA
11b SECOND STEREO CAMERA
12, 120 SUPPORT MEMBER
20, 20A CONTROL UNIT
21 DEPTH ESTIMATION UNIT
22 EDGE DETECTION UNIT
23 OBJECT DETECTION UNIT
24 POSITION/ATTITUDE ESTIMATION UNIT
30 STORAGE UNIT
40 INERTIAL MEASUREMENT UNIT

The invention claimed is:

1. An information processing apparatus, comprising:
a plurality of stereo cameras configured to capture images, wherein
the plurality of stereo cameras includes a first stereo camera and a second stereo camera,
the first stereo camera includes a first camera and a second camera,
the second stereo camera includes the second camera and a third camera, and
a first direction of a baseline length of the first stereo camera intersects a second direction of a baseline length of the second stereo camera;
a depth estimation unit configured to estimate, from the captured images, a depth of an object in the captured images; and
an object detection unit configured to detect the object based on the depth and reliability of the depth, wherein the reliability of the depth is based on an angle of a direction of an edge line of the object with respect to the first direction of the baseline length of the first stereo camera and the second direction of the baseline length of the second stereo camera.

2. The information processing apparatus according to claim 1, wherein the reliability of the depth is a probability distribution at a position where the edge line of the object is present in a captured image of the captured images, and the probability distribution has a higher probability in a case where the direction of the edge line with respect to the first direction and the second direction is closer to a right angle.

3. The information processing apparatus according to claim 2, wherein the object detection unit is further configured to:

calculate a first probability distribution based on the depth and a second probability distribution indicating the reliability of the depth;

based on the first probability distribution and the second probability distribution, calculate a map voting probability that indicates a probability that the object occupies each grid in an occupancy grid map, wherein the occupancy grid map is in which a space in the captured image is divided into a grid shape; and cast a vote on the each grid in the occupancy grid map based on the map voting probability to create the occupancy grid map.

4. The information processing apparatus according to claim 3, wherein the object detection unit is further configured to multiply the first probability distribution and the second probability distribution to calculate the map voting probability.

5. The information processing apparatus according to claim 4, wherein the object detection unit is further configured to:

register, as a key frame, the second probability distribution of a previous frame; and in a case where positions and attitudes of the plurality of stereo cameras change in a current frame, deform the key frame based on variations of the positions and attitudes of the plurality of stereo cameras to calculate the second probability distribution of the current frame, wherein the previous frame is before the current frame.

6. The information processing apparatus according to claim 5, wherein the object detection unit is further configured to:

calculate a first value of the second probability distribution based on the deformation of the key frame;

calculate a second value of the second probability distribution based on a current edge direction; and compare the first value of the second probability distribution with the second value of the second probability distribution to filter the second probability distribution.

7. The information processing apparatus according to claim 1, wherein the first direction of the baseline length of the first stereo camera is perpendicular to the second direction of the baseline length of the second stereo camera.

8. An information processing method, comprising:

estimating, from captured images captured by a plurality of stereo cameras a depth of an object in the captured images, wherein the plurality of stereo cameras includes a first stereo camera and a second stereo camera, the first stereo camera includes a first camera and a second camera, the second stereo camera includes the second camera and a third camera, and a first direction of a baseline length of the first stereo camera intersects a second direction of a baseline length of the second stereo camera; and detecting the object based on the depth and reliability of the depth, wherein the reliability of the depth is based on an angle of a direction of an edge line of the object with respect to the first direction of the baseline length of the first stereo camera and the second direction of the baseline length of the second stereo camera.

9. A non-transitory computer-readable medium having stored thereon, computer-executable instructions, which when executed a processor, cause the processor to execute operations, the operations comprising:

estimating, from captured images captured by a plurality of stereo cameras, a depth of an object in the captured images, wherein the plurality of stereo cameras includes a first stereo camera and a second stereo camera, the first stereo camera includes a first camera and a second camera, the second stereo camera includes the second camera and a third camera, and a first direction of a baseline length of the first stereo camera intersects a second direction of a baseline length of the second stereo camera; and detecting the object based on the depth and reliability of the depth, wherein the reliability of the depth is based on an angle of a direction of an edge line of the object with respect to the first direction of the baseline length of the first stereo camera and the second direction of the baseline length of the second stereo camera.

* * * * *